United States Patent [19]

Futamase et al.

[11] Patent Number: 4,472,993

[45] Date of Patent: Sep. 25, 1984

[54] SOUND EFFECT IMPARTING DEVICE FOR AN ELECTRONIC MUSICAL INSTRUMENT

[75] Inventors: Tsuyoshi Futamase; Mitsumi Kato, both of Hamamatsu, Japan

[73] Assignee: Nippon Gakki Seizo Kabushiki Kaisha, Hamamatsu, Japan

[21] Appl. No.: 420,825

[22] Filed: Sep. 21, 1982

[30] Foreign Application Priority Data

Sep. 22, 1981 [JP] Japan .............................. 56-148768

[51] Int. Cl.[3] .............................................. G01H 1/04

[52] U.S. Cl. ...................................... 84/1.24; 84/1.25; 84/DIG. 26; 84/DIG. 4; 381/62; 381/63; 333/165

[58] Field of Search ................ 84/1.24, 1.25, DIG. 4, 84/DIG. 26; 179/1 J; 333/165, 166, 138–140; 381/62, 63

[56] References Cited

U.S. PATENT DOCUMENTS 4,294,155 10/1981 Turner ................................ 84/1.01

4,338,581 7/1982 Morgan ............................. 333/165

*Primary Examiner*—S. J. Witkowski

*Attorney, Agent, or Firm*—Spensley, Horn, Jubas & Lubitz

[57] ABSTRACT

A sound effect imparting device for an electronic musical instrument is capable of imparting a plurality of desired sound effect such as vibrato and reverberation effects to a digital musical tone generated from the electronic musical instrument. The device comprises a digital arithmetic operation unit constructed with a combination of adders, multipliers, delay circuits, etc., a control unit, a parameter memory and a read-out unit.

By control data and parameter data which are respectively read out from the control unit and the parameter memory by means of the read-out unit, switching of the operation mode of the digital arithmetic operation unit is controlled in a time-sharing manner, whereby a plurality of sound effects are imparted to a musical tone through digital arithmetic operations.

29 Claims, 26 Drawing Figures

SOUND EFFECT IMPARTING DEVICE FOR AN ELECTRONIC MUSICAL INSTRUMENT

BACKGROUND OF THE INVENTION

1. Field of the Invention

This invention relates to the field of sound effect imparting devices, and in particular, to a sound effect imparting device for imparting a plurality of desired effects, such as vibrato effect and reverberation effect, to digital musical tone signals produced by an electronic musical instrument or other sound producing systems, in a simple operation using a digital memory and a digital operational circuit.

2. Description of the Prior Art

There are in prior art sound effect imparting devices for imparting sound effect such as vibrato, chorus, ensemble (symphonic chorus) and, reverberation, to musical tones produced by an electronic instrument and the like. Those prior art sound effect imparting devices, however, have a drawback in that a respective sound effect imparting circuit must be provided corresponding to each sound effect when a plurality of sound effects are imparted to a musical tone signal, with resultant in increase in the construction scale of the device.

In addition to the above drawback, since in many cases an analog delay element, such as BBD (Bucket Brigade Device) and CCD (Charge Coupled Device), is used for imparting sound effects, changing characteristics of the imparted sound effects are difficult and signal-to-noise ratio of the sound with imparted sound effects is not good. Moreover, in order to apply the sound effect imparting device to an electronic musical instrument of a type wherein musical tone signals are in the form of digital signals, the digital musical tone signals must be fed to the sound effect imparting device after converting those signals into analog signals through a digital-to-analog converter, and therefore a filter of steep cut-off characteristics is required, making circuit integration difficult, and further making the device scale larger.

SUMMARY OF THE INVENTION

Accordingly, this invention is directed to eliminate the above-mentioned drawbacks of prior art, and an object of this invention is to provide a sound effect imparting device to provide a sound effect imparting device for an electronic musical instrument, in which an effect imparting circuit for any desired sound effect is formed by means of a digital memory and a digital operation circuit based on the instruction of programmed control data, whereby a plurality of different sound effects may be easily imparted to musical tones in a time-sharing manner; such as imparting a reverberation effect after imparting a vibrato effects, imparting different kinds of sound effect in parallel and, to musical tones of plural sequences, imparting different kinds of sound effect to each musical tone sequence.

Another object of this invention is to provide a sound effect imparting circuit for an electronic musical instrument, in which a digital-coded musical tone signal can be directly inputted without employing a D/A converter and a filter, whereby device scale can be minimized.

A still further object of this invention is to provide a sound effect imparting circuit, in which parameters for controlling the characteristics of sound effects can be changed freely according to the instructions of programmed control data, whereby the sound effect characteristic can be changed during the performance of the musical instrument.

To achieve the above-mentioned objects of this invention, the addition of a plurality of desired effects is designed to be accomplished by a digital operation processing on the time-sharing basis, and the content of digital operation processing in this case is arranged so as to be freely determined by parameters and control data which correspond to individual effects.

According to this invention for imparting the modulation effect, such as vibrato or chorus effect, a digital filter corresponding to a desired modulation effect is designed with a digital memory and digital operational circuit according to the instruction of the control program, and digital-coded musical tone signals are fed to this digital filter. Since the output signal frequency of the digital filter can be changed by changing a multiplication factor in the digital filter, the multiplication factor in the above filter is changed with time according to the desired modulation effect.

On the other hand, for imparting the reverberation effect, a reverberation tone forming circuit corresponding to the characteristics of the desired reverberation effect is formed with a digital memory and a digital operational circuit according to the instruction of the control program, and digital-coded musical tone signals are fed to this reverberation tone forming circuit. Further, for combining a plurality of sound effects, such as combining the vibrato and reverberation effects, the digital filter and the reverberation tone forming circuit are formed within each sampling period of the input digital musical tone signal in the time-sharing manner, whereby a plurality of sound effects are imparted by the time-sharing processing.

The invention will now be described in detail with reference to the accompanying drawings.

DETAILED DESCRIPTION OF THE PREFERRED EMBODIMENT

For the sake of convenience, the basic configuration for imparting a desired modulation effect through the digital filter and the basic configuration for imparting a desired reverberation effect through the reverberating tone forming circuit employing the digital memory will be described first.

Figure 1:
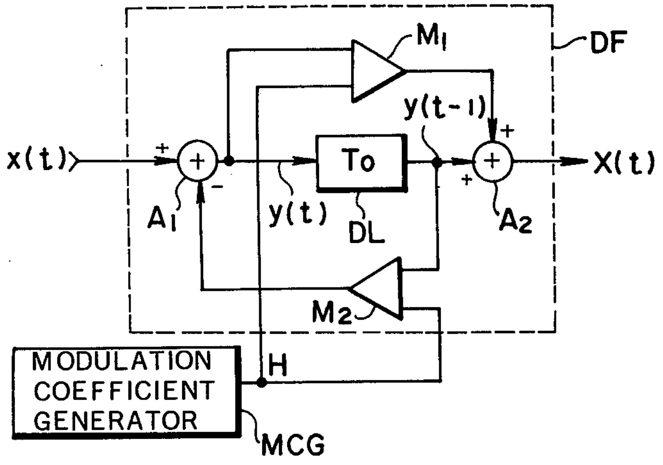
FIG. 1 shows a basic configuration of the digital filter to be used in the effect imparting device of this invention.

FIG. 1 shows the basic configuration of the digital filter for imparting a desired modulation effect, in which the digital filter consists of an all-pass type digital filter DF and a modulation coefficient generator MCG. The digital filter DF comprises adders A1 and A2, multipliers M1 and M2, and a delay element DL having a delay time equal to the sampling period T0 of a digital musical tone signal.

The output data of the adder A1 which receives amplitude data x(t) ("t" represents the time slot No. 0, 1, 2, . . . corresponding to each sampling period) of the input digital musical tone signal as an adder input (+) is supplied to the delay input of the delay element DL and the multiplication input of the multiplier M1. The output data of the delay element DL is fed to the addition input (+) of the adder A2, multiplied by a modulation coefficient H at the multiplier M2, and returned to the subtract input (−) of the adder A1. Further, the output data of the adder A1 fed to the multiplication input of the multiplier M1 is multiplied by the modulation coefficient H at the multiplier M1, and supplied to the addition input (+) of the adder A2. Then, the output data of the adder A2 is outputted as amplitude data x(t) phase (frequency) modulated in conjunction with the change with time of the modulation coefficient H generated by the modulation coefficient generator MCG, i.e., as amplitude data x(t) imparted the modulation effect. In this case, the delay element DL comprises a digital memory and the modulation coefficient H is set to a value between −1 and 1 with −1 and 1 excluded.

In such configuration, if the output data of the adder A1 is y(t), the output data of each element can be expressed as follows:

(a) Output data of the delay element DL: $y(t-1)$
(b) Output data of the multiplier M2: $H\cdot y(t-1)$
(c) Output data of the multiplier M1: $H\cdot y(t)$
(d) Output data of the adder A2: $H\cdot y(t)+y(t-1)$ Since, in this case, the output data y(t) of the adder A1 becomes $y(t)=x(t)-H\cdot y(t-1)$, the output data X(t) of the adder A2 can be expressed as follows eventually.

$$\begin{aligned} X(t) &= H\cdot y(t) + y(t-1) \quad (1)\\ &= H\{x(t) - H\cdot y(t-1)\} + y(t-1)\\ &= H\cdot x(t) + y(t-1)(1-H^2)\end{aligned}$$

A transfer function F(Z) of the circuit of FIG. 1 which sends out the output data given in Equation (1) above becomes $$F(Z) = \frac{Z^{-1} - H}{1 - HZ^{-1}} \quad (2)$$

Accordingly, frequency response characteristics $F(e^{j\omega})$ becomes as given in the following equation.

$$F(e^{j\omega}) = \frac{\cos\omega - 2H + H^2\cos\omega - j\sin\omega(1-H^2)}{1 - 2H\cos\omega + H^2} \quad (3)$$

Now is the amplitude data is x(t), and $x(t)=\cos(\omega 0\ t)$ is added, the output data X(t) of the adder A2 will be $$X(t) = |F(e^{j\omega 0})|\cos(\omega 0\ t+\theta) \quad (4)$$

where $$\theta = \arg(F(e^{j\omega 0})) = -\tan\frac{(1+H^2)\sin\omega 0}{\cos\omega 0 - 2H + H^2\cos\omega 0} \quad (5)$$

Since $|F(e^{j\omega 0})|=1$, the output data X(t) becomes $$X(t)=\cos(\omega 0t+0) \quad (6)$$

Now suppose $H=K0\cdot\sin\omega mt$, i.e., the modulation coefficient H is changed with time according to sine wave signal $K0\cdot\sin\omega mt$, then the output signal X(t) becomes as follows.

$$X(t)=\cos(\omega 0\ t+\theta(t)) \quad (7)$$

Besides, the frequency fx of the input data x(t) and the frequency fX of the output data X(t) become as follows:

$$fx=\omega 0 \quad (8)$$

$$fX=\omega 0+\{\theta(t)-\theta(t-1)\} \quad (9)$$

The output data X(t) phase-modulated by the modulation coefficient H can be obtained accordingly.

Figure 2A:
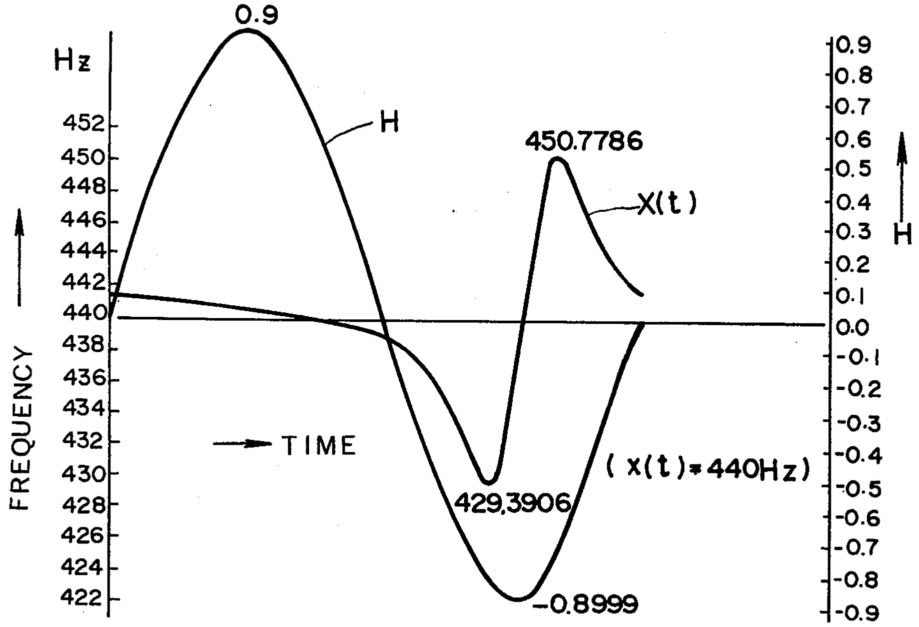
FIGS. 2(*a*) and 2(*b*) are graphs showing the frequency change of an output signal when the multiplication factor is changed in the circuit shown in FIG. 1.
Figure 2:
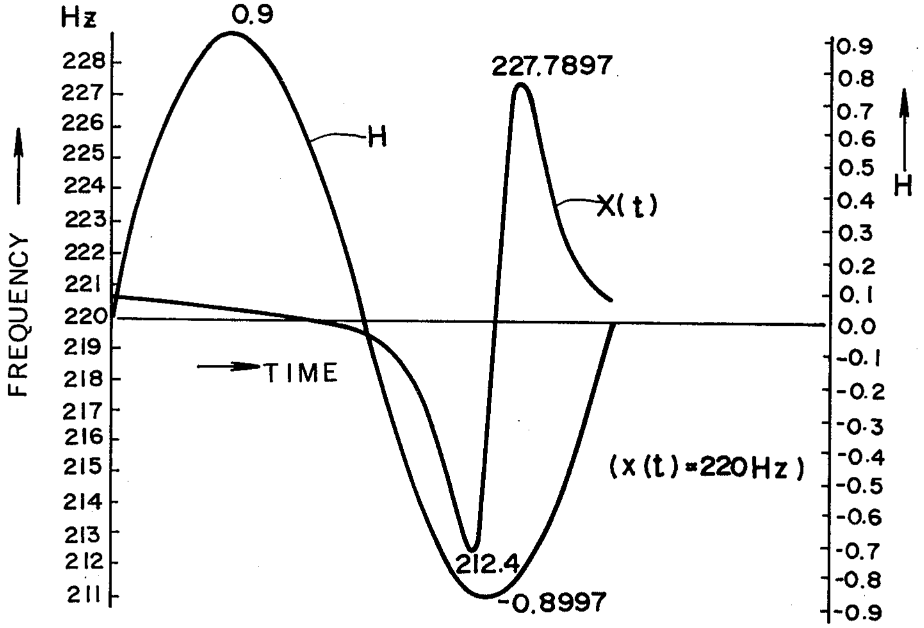

FIG. 2(*a*) is a graph showing the frequency change of the output data X(t) when 440-Hz musical tone data x(t) is fed with the modulation coefficient H being 0.9 sinωmt, while FIG. 2(*b*) is a graph showing the frequency change of the output data X(t) when 220-Hz amplitude data x(t) is fed. As will be evident from these graphs, the amplitude data X(t) phase-modulated by the modulation coefficient H varying with time can be obtained.

Figure 3:
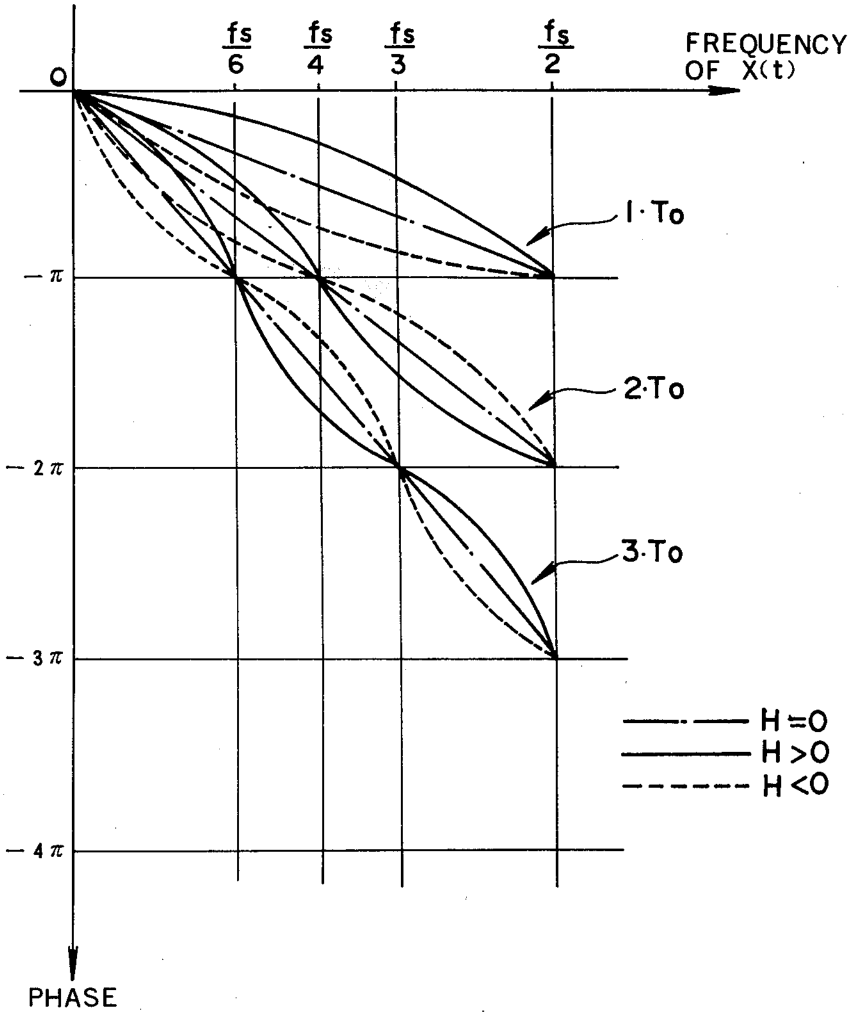
FIG. 3 is a graph showing the phase change of the output signal according to the frequency change of the input signal in the circuit shown in FIG. 1.

FIG. 3 shows the phase deviation characteristic of the output data X(t) with respect to any given frequency of the input data x(t), when the modulation coefficient H is taken to be H=0, H>0, and H<0. This diagram shows characteristic curves when the delay time of the delay element DL is set to 1·T0, 2·T0, and 3·T0. In FIG. 3, fs represents the sampling frequency of the amplitude data x(t).

Figure 4:
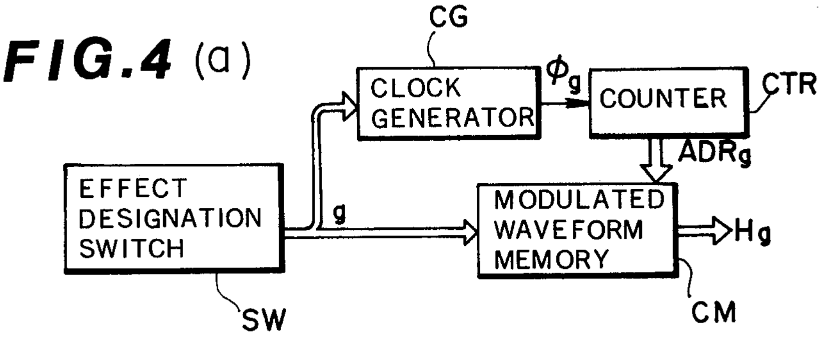
FIGS. 4(*a*) and 4(*b*) show block diagrams of two examples of the modulation coefficient generator shown in FIG. 1.
Figure 4:
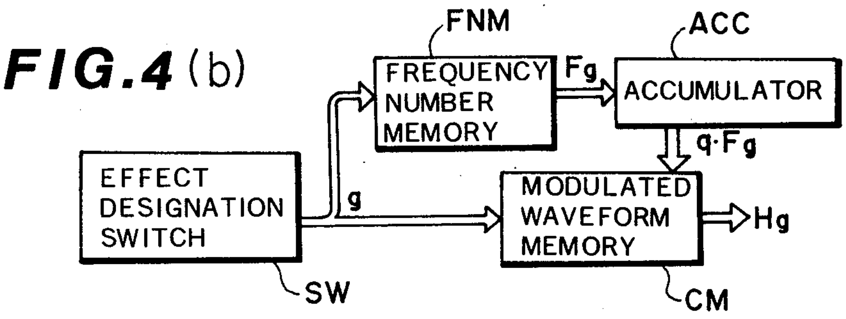

The modulation coefficient generator MCG for generating the modulation coefficient H may be configured as shown in FIG. 4(*a*) or FIG. 4(*b*). That is, as shown in FIG. 4(*a*), there is provided a modulated waveform memory CM for storing predetermined modulated waveforms MWg (g: type of modulation effect) which respectively correspond to each of a plurality of modulation effects, and a clock pulse $\phi g$ of frequency fg corresponding to a modulation type signal g is caused to be generated from a clock generator CG where the modulation type signal g represents the type of the modulation effect outputted from an effect designation switch SW. This clock pulse $\phi g$ is counted by a counter CTR, which in turn generates a memory address signal ADRg whose changing speed corresponds to the modulation type signal g. The memory address signal ADRg is supplied to the modulated waveform memory CM as a lower address signal. At the same time the modulation type signal g is supplied as a higher address signal (a signal designating type of modulated waveform) of the modulated waveform memory CM. Through the above operations the modulated waveform MWg which changes with time coresponding to the modulation effect designated by the effect designation switch SW can be produced to be used as the modulation coefficient Hg.

Furthermore, as shown in FIG. 4(*b*), the portion consisting of the clock generator CG and the counter CTR in FIG. 4(*a*) may be composed by a frequency number memory FNM and an accumulator ACC. More particularly, in FIG. 4(*b*), the frequency number memory FNM is provided for storing a frequency number Fg (numerical data) which determines the frequency of each modulation effect, and the frequency number Fg corresponding to the type of the modulation effect designated by the effect designation switch SW is read out from the frequency number memory FNM to be fed to the accumulator ACC. The frequency number Fg is accumulated by the accumulator ACC at a given rate in response to a clock pulse, an accumulated value q·Fg (q=1, 2, . . . ) of the repetition period corresponding to the frequency number Fg is formed, the accumulated value q·Fg being supplied to the modulated waveform memory CM as a lower address signal thereof. As a result, a modulated waveform MWg which varies with time corresponding to the modulation effect designated by the effect designation switch SW can be generated from the modulated waveform memory CM to be used as the modulation coefficient Hg. In this case, it may be feasible as an alternative that a reference modulated waveform is caused to be generated from the modulated waveform memory, and the product of said modulated waveform and a coefficient by corresponding to the type of the modulation effect is taken as the modulation coefficient Hg.

Figure 5:
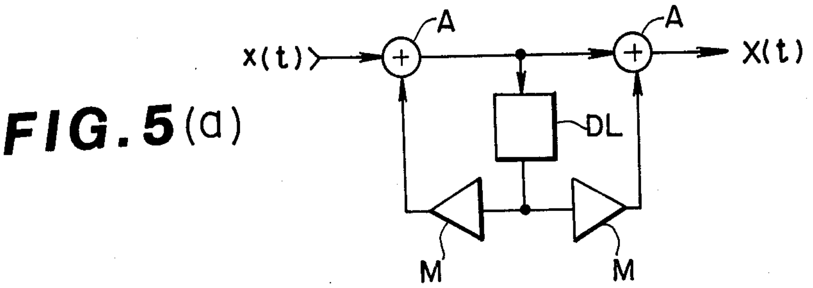
FIGS. 5(*a*) through 5(*d*) show other examples of the digital filter to be used in the device of this invention.
Figure 5:
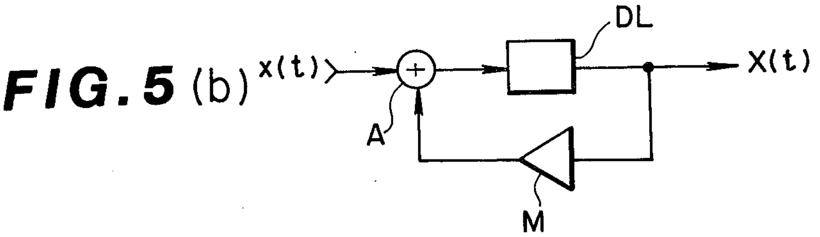
Figure 5:
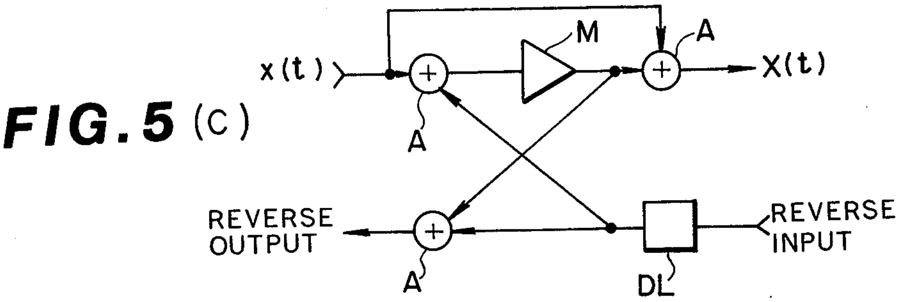
Figure 5:
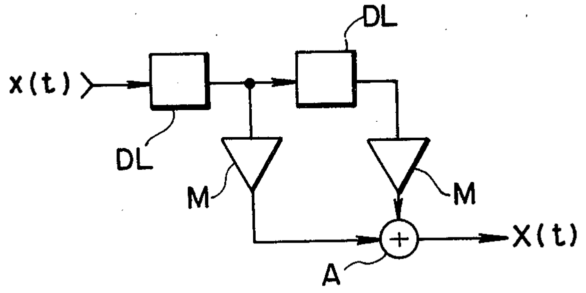

Though, in the configuration shown in FIG. 1, the digital filter DF is made up of a first-order all-pass type filter, it may be an all-pass type filter of higher order. Moreover, the modulation effect similar to the case of FIG. 1 may be obtained by changing the factor of a multiplier M of a digital filter, such as a low-pass filter (or high-pass filter) shown in FIG. 5(*a*), a comb filter shown in FIG. 5(*b*), a lattice-type filter shown in FIG. 5(*c*), and a direct-type FIR filter shown in FIG. 5(*d*).

Basic Configuration of Delay Circuit Employing Digital Memory

When arrangement is made so as to store in the digital memory the amplitude data x(t) at each sampling time of input digital musical tone signal sequentially according to the time lapse, in order to read at time t the amplitude data x(t−i) stored at the time (t−i), it is only required that the address interval ΔADR changed during time i with respect to the address data ADR(t) at the sampling time t is subjected to addition or subtraction as given in Equation (10) or (11) to find an address data ADR(t−i) at the time (t−i), and this address data ADR(t−i) is fed to the address input of the digital memory.

$$ADR(t-i)=ADR(t)+\Delta ADR \quad (10)$$

$$ADR(t-i)=ADR(t)-\Delta ADR \quad (11)$$

Through the above operation, the amplitude data x(t−i) stored at time (t−i) can be read at the timing delayed by time i which is expressed as follows:

$$i=\Delta ADR\times T0 \quad (12)$$

That is, by providing the address interval ΔADR corresponding to a desired delay time i, the amplitude data x(t−i) stored at time (t−i) can be read out at the timing delayed by time i. In this case, Equation (10) is applied to the case where the amplitude data x(t) is stored sequentially from higher address to lower address according to a lapse of time, while Equation (11) is applied to the case where the amplitude data x(t) is stored sequentially from lower address to higher address.

Accordingly, the delay circuit to be used in the sound effect imparting device of this invention comprises essentially a digital memory DM for storing the amplitude data x(t) sequentially, an address data generator AG for forming the address data ADR(t−i) for read-out expressed in Equation (10) or (11), and a delay length data memory DDM for generating aforementioned address interval ΔADR as a delay length data DLD.

Figure 6:
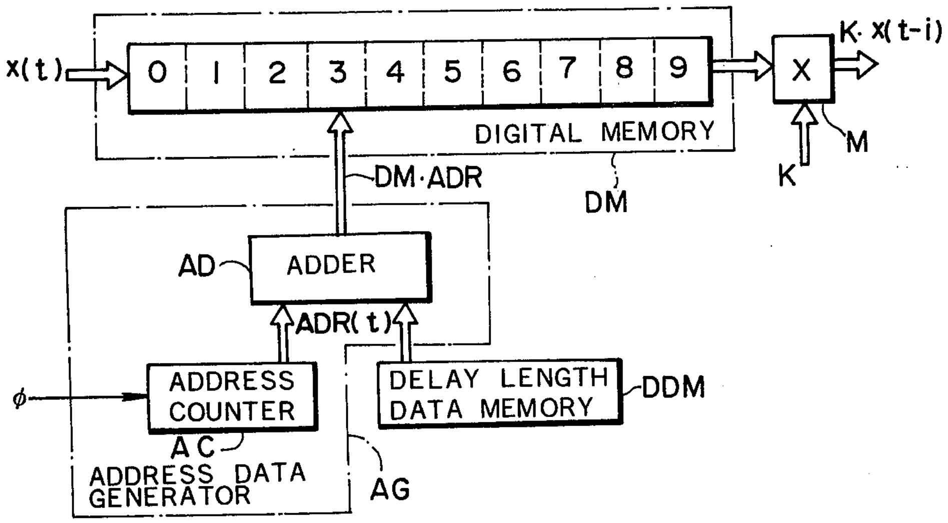
FIG. 6 and FIG. 7 show basic configurations of the delay circuit to be used in the device of this invention.

FIG. 6 is a block diagram of an example of a delay circuit designed based on the above-mentioned idea, and there are provided a digital memory DM, an address data generator AG, a delay length data memory DDM, and a multiplier M.

Figures 8A, 8B, 8C, 8D:
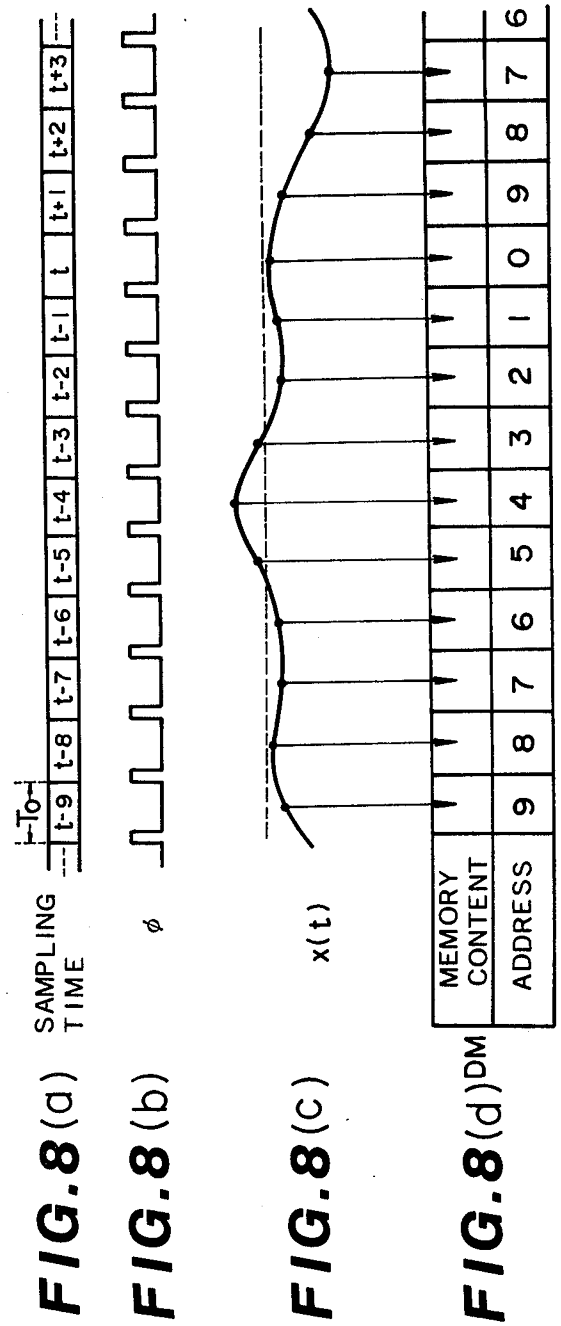
FIGS. 8(*a*) through 8(*d*) are time charts illustrating the operation of the delay circuit of FIG. 6.

As shown in the time chart of FIG. 8(*a*)-(*d*), the digital memory DM stores the amplitude data x(t) which is composed of amplitude of the input digital musical tone signal at each sampling time, at each address of "0" to "9" from the higher address "9" to the lower address "0" sequentially. The digital memory DM may, for example, comprise a RAM (random access memory) or a shift register.

The designation of WRITE address and READ address for the amplitude data x(t) in this digital memory DM is performed by the address data generator AG. The address data generator AG comprises an address counter AC and an adder AD, generates a WRITE address data ADR(t+i) which is updated according to the update of sampling time i, also generates a READ address data ADR(t−i) which is expressed by Equation (10), and outputs these data as address data DM·ADR for the digital memory DM. That is, the address counter AC counts (down-counting) a clock pulse $\phi$ of the period T0 which is synchronized with the sampling period T0 of the amplitude data x(t), outputs the count value as a WRITE address data ADR(t) of the amplitude data x(t) at the current sampling time t, and feeds the WRITE address data ADR(t) to the adder AD. In the mean time, the delay length data memory DDM supplies the delay length data DLD corresponding to the desired delay time i (ΔADR=i/T0) to the other addition input of the adder AD. Then, the adder AD performs calculation in accordance with Equation (10) at this sampling time t, outputs the resultant value as the READ address data ADR(t−i) for the amplitude data x(t−i), which the amplitude data stored time i before the current time t, and then outputs the output data ADR(t) of the address counter AC directly as the WRITE address data ADR(t) for the amplitude data x(t) stored at the current time t.

Now, from the digital memory DM, the amplitude data x(t−i) is read out at time t, and the amplitude data x(t) is stored at an address designated by the address data ADR(t).

The amplitude data x(t−i) thus read out from the digital memory DM at the timing delayed by time i is multiplied by a factor K for amplitude level control at the multiplier M, and level control is performed. The amplitude data K·x(t−i) resulted from the level control is converted to an analog signal by a D/A converter (not shown). These operations are performed at every sampling time. As a result, a reverberation tone delayed behind the input musical tone by time i may be produced. In this case, by providing a plurality of different delay length data DLD within a single sampling time sequentially on the time-sharing basis, a plurality of reverberation tones of different delay time can be obtained within the same sampling time. The delay circuit shown in FIG. 6 is used for forming initial echoes of complex reverberation characteristic with the amplitude level and delay time varying randomly due to difference in the distance to the sound reflecting object such as surrounding walls.

Figure 7:
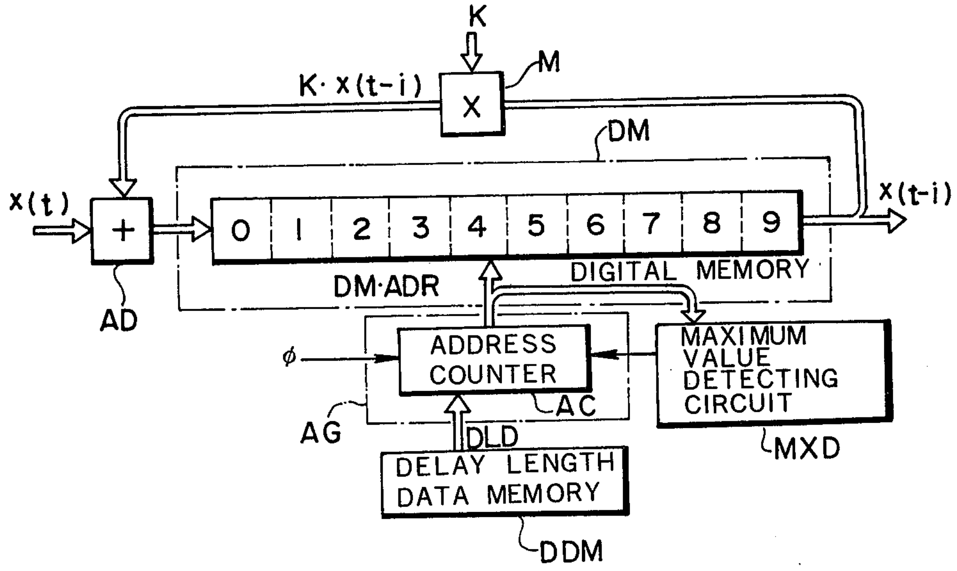

FIG. 7 is a block diagram of another embodiment of the delay circuit. The delay circuit of this embodiment has a preset type down counter as the address counter AC of the address data generator AG. Arrangement is made so that the repetition period of the address data ADR(t), ADR(t+1), . . . ADR(t+i) outputted from the address counter AC is brought to correspond to the delay time designated by the delay length data DLD by presetting the delay length data DLD corresponding to a desired delay time i to the address counter AC, and causing the address counter AC to perform down count from the preset value (DLD), and that the amplitude data x(t−i) having stored time i before is read out from the address to which the amplitude data x(t) is loaded at the current time t.

The above will be described in more detail. When the digital memory DM is made up of 10 words as shown in FIG. 7, the maximum value of address interval becomes "10", and the amplitude data x(t−10) delayed by time 10·T0 can be read out. In the case when the desired delay time i is to be set at, for example, 6·T0, output data DM·ADR of the address counter AC is made to be the repetition of 5, 4, 3, 2, 1, 0, the range of address to be used in the digital memory DM is reduced corresponding to the desired delay time i(i=6·T0), the address at which the amplitude data x(t) is to be written is brought to coincide with the address at which the amplitude data x(t−i) has been loaded time i before the current time i, whereby the amplitude data x(t−i) loaded time i before is read out from the address at which the amplitude data x(t) is to be loaded. For this purpose, the delay circuit of FIG. 7 is provided with a maximum value detecting circuit MXD for detecting the change of the output data DM·ADR of the address counter AC from "0" to "9", and presetting delay length data DLD outputted from the delay length data memory DDM into the address counter AC in response to the detected signal.

On the other hand, the delay circuit of FIG. 7 is designed, instead of loading the amplitude data x(t) at the current time t directly into the digital memory DM, to return (feedback) the amplitude data x(t−i) time i before at a predetermined proportion and to load the sum of the returned value K·x(t−i) and the amplitude data x(t) at the current time t. For this purpose, there are provided a multiplier M for multiplying the amplitude data x(t−i) read out from the digital memory DM by the factor K, and returning the resultant product to the data input side of the digital memory DM, and an adder AD for adding output data K·x(t−i) of the multiplier M and amplitude data x(t) at the current time t, and supplying "x(t)+K·x(t−i)" to the data input of digital memory DM.

In the delay circuit of such configuration, if desired delay time i is 6·T0, the delay length data DLD which can be expressed by $$DLD=6-1=5$$

at the time when the output data DM·ADR of the address counter AC is changed from "0" to the maximum value ("9" in this case), is preset to the address counter AC. Consequently, the address counter AC repeatedly outputs address data DM·ADR repeating the values of 5, 4, 3, 2, 1, 0 as the sampling time proceeds at every sampling period T0. In addition, the amplitude data x(t−i) time i before stored at the address specified by address data DM·ADR is first read out at each sampling time, and then the data obtained by adding the amplitude data x(t−i) time i before and amplitude data x(t) at the current time t at a specified proportion, i.e., "x(t)+K·x(t−i)" is loaded at the same address as the address from which the amplitude data x(t−i) is read out, is loaded.

In the delay circuit configured as such, the address at which amplitude data x(t) at the current sampling time t is identical with the address from which the amplitude data x(t−i) time i before is read out. In addition, since the amplitude data x(t−i) time i before has been returned, data about the amplitude level and reverberation whose delay time changes regularly may be obtained. Accordingly, in this embodiment, the delay circuit shown in FIG. 7 is used for generating reverberation tones of regular reverberation characteristic.

In this delay circuit since data about the reverberation tone which is obtained ultimately becomes larger in the level than the original amplitude data, data about reverberation tone is, in practice, directed to the output unit of the reverberation tone forming circuit through an attenuator.

In this case, if the factor K is set so as to be "$-1<K<0$", no such attenuator is required.

Now, steps by which reverberation tones are formed will be described using the functional block diagram of the reverberation tone forming circuit shown in FIG. 9.

Reverberation Tone Forming Steps

Figure 9:
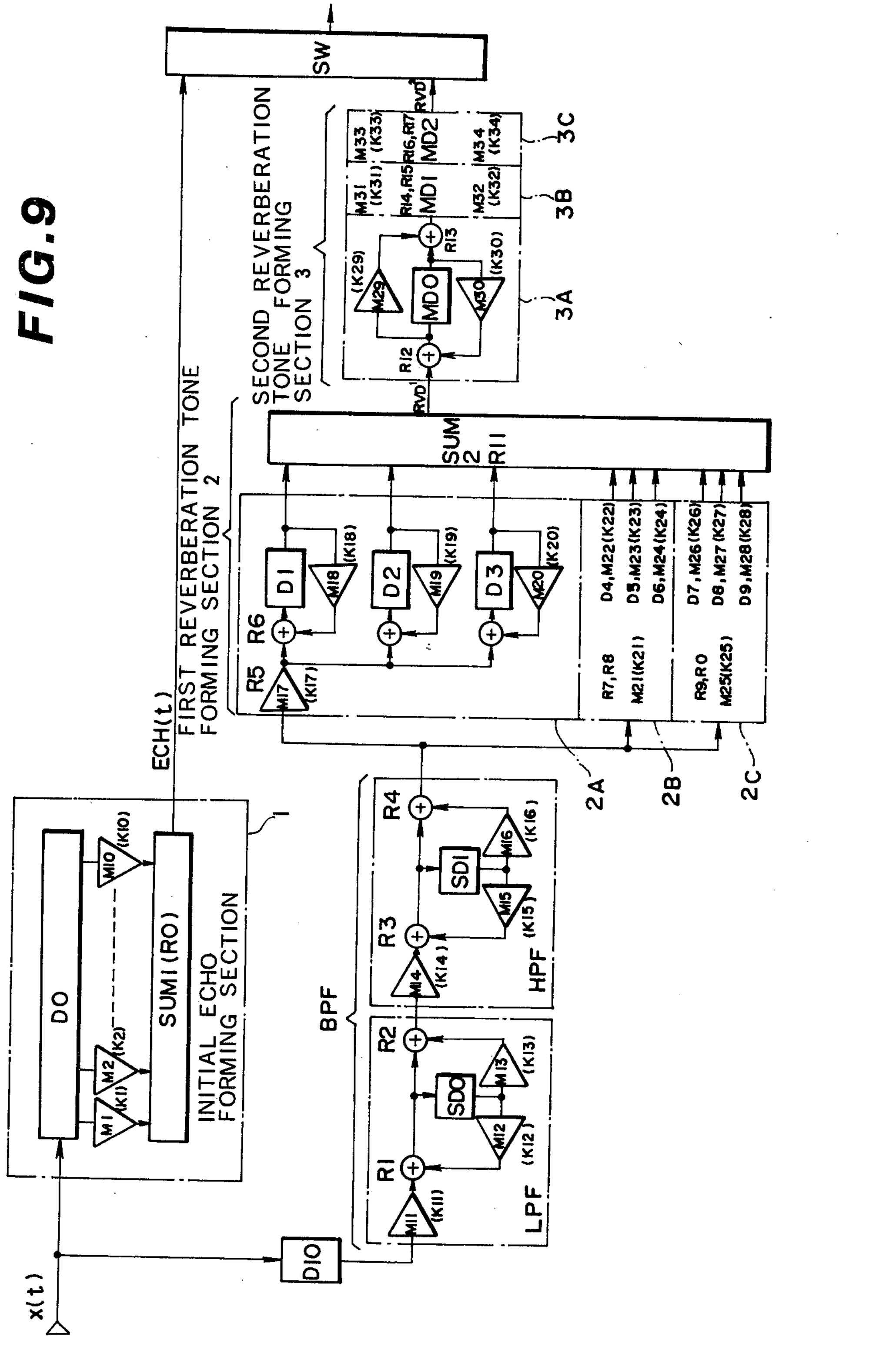
FIG. 9 is a functional block diagram of an example of the reverberation tone forming circuit to be used in the device of this invention.

The reverberation tone forming steps in the embodiment of FIG. 9 is largely classified to a step for forming initial echo whose amplitude level and delay time vary randomly, and a step for forming reverberation tone following the initial echo, whose amplitude level and delay time change regularly. In this embodiment, the initial echo and the reverberation tone are designed to be formed by respective separate delay circuit units.

In FIG. 9, the amplitude data x(t) of input digital musical tone signal of sampling period T0 is fed to an initial echo forming section 1 which is the first of a delay circuit sequence.

The initial echo forming section 1 is one wherein the delay circuit shown in FIG. 6 is used, and comprises a memory D0 having memory address of 2048 words, multipliers M1 to M10 for multiplying 10 kinds of the amplitude data x(t−il), x(t−i2), . . . x(t−i10) time im (m=1 to 10) before, which have been read out from the memory D0 and have different delay time from each other, by amplitude level control factors Km (m=1 to 10), and an adder SUM1 which is for finding the sum $$\sum_{m=1}^{10} Km \cdot x(t - im)$$

of multiplied value outputs K1·x(t·il), K2·x(t−i2), . . . K10·x(t−i10) of these multipliers M1−M10 and outputting the sum $$\sum_{m=1}^{10} Km \cdot x(t - im)$$

as the instantaneous value ECH(t) of the initial echo at the current time t.

The adder SUM1, in addition, has a register R0 for the temporary storage of $$\sum_{m=1}^{10} Km \cdot x(t - im)$$

until the next sampling time (t+1).

In the initial echo forming section 1 configured as such, the amplitude data x(t) at the current time t is loaded to the address corresponding to the current time t of all the memory addresses of 2048 words of the memory D0. Then, since the sum $$\sum_{m=1}^{10} Km \cdot x(t - 1 - im)$$

at the previous sampling time (t−1) is kept in the register R0 of the adder SUM1, the content of the register R0 is reset. Then, for reading the amplitude data x(t−i1) out of all 10 kinds of the amplitude data x(t−i1) through (t−i10) from memory D0, an address of the memory D0 corresponding to the delay time i1 is designated, and the amplitude data sampled from the address time i1 before is read. In this case, the address for reading the amplitude data x(t−i1) time i1 before can be obtained by Equation (10).

The amplitude data x(t−i1) of the delay time i1 thus read is fed to the multiplier M1, and is multiplied by the amplitude level control factor K1 corresponding to the first echo ECH1 of the delay time i1. The product K1·x(t−i1) is fed to the adder SUM1, and is added to the current value of the register R0. The sum is again stored in the register R0. In this case, since the content of the register R0 has been reset immediately after the amplitude data x(t) at the current time t was loaded, the content to be loaded to the register R0 at this time is the data K1·x(t·i1).

As reading and level controlling of the amplitude data x(i1) of the delay time i1 complete in the above fashion, i.e., as processing of the first echo ECH1 completes, then reading and level controlling of the amplitude data x(t−i2) concerning the second echo ECH2 of the delay time i2 are performed as in the case of the first echo ECH1. As a result, in the register R0 of the adder SUM1, the sum [K1·x(t−i1)+K2·x(t−i2)] of the data K1·x(t−i1) about the first echo ECH1 and the data K2·x(t−i2) about the second echo ECH2 is stored.

Such processing is performed until the completion of the tenth echo ECH10. As a result, the sum $$\sum_{m=1}^{10} Km \cdot x(t - im)$$

of the amplitude data K1·x(t−i1) to K10·x(t−i10) of the first echo ECH1 to the tenth echo ECH10 is stored in the register R0. This sum $$\sum_{m=1}^{10} Km \cdot x(t - im)$$

is output via a switch circuit SW as an instantaneous value ECH(t) of the initial echo consisting of the first echo ECH1 to the tenth echo ECH10.

The switch circuit SW selectively outputs the output of the register R0 in an initial echo forming time Ta, and selectively outputs the output of the delay circuit of the second delay circuit sequence in time Tb after the initial echo forming (refer to Table 1).

TABLE 1

| One sampling period T0 (= Ta + Tb) | |
|---|---|
| Ta | Tb |
| Initial echo forming time | Reverberation tone forming time |

The data ECH(t) selected and outputted by this switch circuit SW is converted to an analog signal by a D/A converter (not shown), fed to a speaker (not shown), and then produced as an initial echo for the input musical tone.

Figure 10:
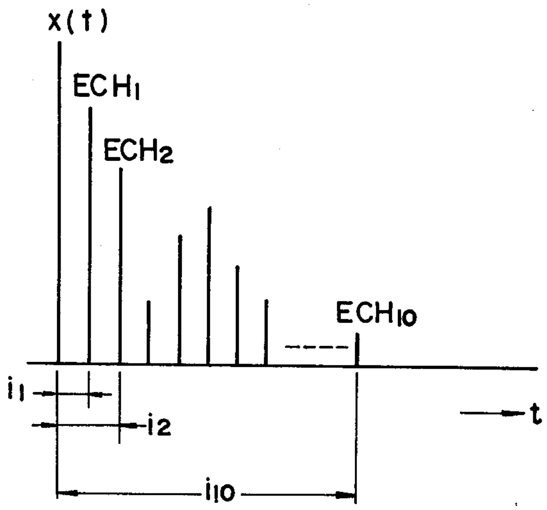
FIG. 10 is a characteristic diagram of initial echoes to be produced by the example of FIG. 9.

Accordingly, by varying the delay time im and the amplitude level control factor Km of the first echo ECH1 to the tenth echo ECH10, respectively, initial echo whose amplitude level and delay time vary randomly may be obtained as shown in FIG. 10.

Now, let the sampling period T0 of input digital musical tone signal be 0.04 ms (25 kHz). Then, when a data x(t−1626) stored at the address which is apart, for example, 1626 words from address ADR(t) at which the amplitude data x(t) at the current time t is loaded is read out, the delay time becomes $$i = 1626 \times 0.04 \approx 65 \text{ ms}$$

and an initial echo ECHm delayed by about 65 ms from the input musical tone can be generated.

Meanwhile, the amplitude data x(t) is also fed to the delay circuit of the second delay circuit sequence for forming a reverberation tone after the generation of the initial echo.

The delay circuit of the second sequence comprises a memory D10 for supplying the amplitude data x(t) delayed by time j to a band-pass filter BPF, the digital type band-pass filter BPF having a low-pass filter LPF and a high-pass filter HPF, which are for passing only the component of a given frequency band of the amplitude data x(t−j) of delay time j supplied from the memory D10, a first reverberation tone forming section 2 of comb filter configuration which forms reverberation tone data RVD1 of a large delay based on the amplitude data x(t−j) which has passed the band-pass filter BPF, and a second reverberation tone forming section 3 of all-pass filter configuration which forms reverberation tone data RVD2 of a small delay based on the reverberation tone data RVD1.

In such configuration, the amplitude data x(t) at the current time t is loaded to the address ADR(t) corresponding to the current time t, among all memory addresses of 2048 words of the memory D10. Then, for reading the amplitude data x(t−j) out of all the amplitude data x(t) stored in the memory D10, an address of the memory D10 corresponding to the delay time j is designated, and the amplitude data x(t−j) sample time j before is read from the above address. In this case, the address from which the amplitude data x(t−j) is to be read can be obtained by Equation (10) in the same manner as in the case of initial echo forming. Moreover, the delay time j is set slightly larger than the delay time i10 concerning the tenth echo ECH10. (j>i10).

The amplitude data x(t−j) of the delay time j thus read from the memory D10 is fed to a multiplier M11 of the low-pass filter LPF, and is multiplied by a predetermined factor K11. The product K11·x(t−j) is temporarily stored in a register R1. Then, from a memory SD0 having a memory address of one word, the amplitude data x(t−j−1) loaded one sampling time (1·T0) before is read, and multiplied by a predetermined factor K12 at a multiplier M12. Then, the output K12·x(t−j−1) of the multiplier M12 and the amplitude data K11·x(t−j) time j before temporarily stored in the register R1 are added. The sum [K12·x(t−j−1)+K11·x(t−j)] is again temporarily stored in the register R1 and also in a register R2. Then, the amplitude data x(t−j−1) loaded one sampling time (1·T0) before the current time t is again read from the memory SD0, and is multiplied by a predetermined factor K13 at a multiplier M13. The resultant product K13·x(t−j−1) is added to the value [K12·x(t−j−1)+K11·x(t−j)] temporarily registered in the register R2, and the resultant sum [K12·x(t−j−1)+K11·x(t−j)+K13·x(t−j−1)] is again temporarily stored in the register R2. Then, for using the value [K12·x(t−j−i)+K11·x(t−j)] temporarily stored in the register R1 in the next sampling period (t+1), this value is loaded to the memory SD0.

As such operation is performed in each sampling period T0, the amplitude data x(t−j) time j before, which is rid of high frequency components of a predetermined bend width is output from the register R2 of the low-pass filter LPF, and this amplitude data x(t−j) is sent to the high-pass filter HPF.

Then, similar to the case of the low-pass filter LPF, the amplitude data x(t−j) time j before, which is rid of the low frequency components of a predetermined band width.

That is, the output data x(t−j) of the register R2 of the low-pass filter LPF is fed to a multiplier M14, and is multiplied by a predetermined factor K14 at the multiplier M14. The resultant product K14·x(t−j) is temporarily stored in a register R3. Then, the amplitude data x(t−j−1) loaded one sampling time (1·T0) before, is read from a memory SD1 having one word memory address, and is multiplied by a predetermined factor K15 at a multiplier M15. Then, the value K15·x(t−j−1) obtained from the multiplier K15 is added to amplitude data K14·x(t−j) time j before temporarily stored in the register R3, and the resultant sum [K14·x(t−j)+K15·x(t−j−1)] is temporarily stored in the register R3 as well as in a register R4. Then, the amplitude data x(t−j−1) loaded one sampling time (1·T0) before the current time t is again read from the memory SD1, and is multiplied by a predetermined factor K16 at a multiplier M16. The resultant product K16·x(t−j−1) is added to the value [K14·x(t−j)+K15·x(t−j−1)] temporarily stored in a register R4. Then, for using the value [K14·x(t−j)+K15·x(t−j−1)] temporarily stored in the register R3 in the next sampling period (t+1), this value is loaded to the memory SD1.

As a result of such operation performed every sampling period T0, the amplitude data x(t−1) time j before, which is rid of the low frequency components of a predetermined band width is output from the register R4 of the high-pass filter HPF.

Since the register R1 of the low-pass filter LPF is not used until the next sampling time after the content thereof is loaded to the memory SD0, it can be used in common with the register R3 of the high-pass filter HPF.

The amplitude data x(t−j) time j before, which is rid of the low and high frequency components of predetermined band widths at the band-pass filter BPF is fed to the first reverberation tone forming section 2.

Figure 11:
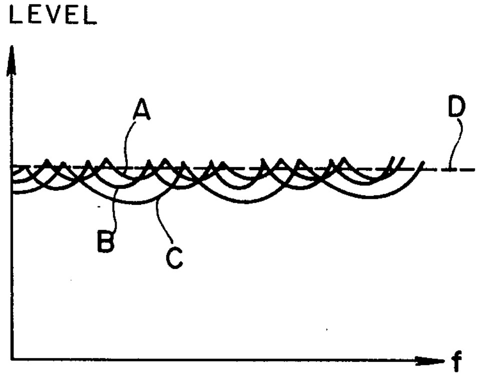
FIG. 11 is a diagram showing the frequency response of the delay circuit of comb filter configuration.

In the first reverberation tone forming section 2, delay circuits 2A, 2B and 2C are provided in parallel in the comb filter configuration with different delay times. These delay circuits 2A, 2B and 2C are provided in parallel so as to obtain a flat frequency response of delay circuits of the comb filter configuration. (When a single delay circuit is used, frequency response becomes wavy as shown by reference symbols A, B and C in FIG. 11.) That is, by providing these delay circuits 2A, 2B and 2C of different delay times in parallel, the frequency response as a whole can be made flat as shown by reference symbol D in FIG. 11. In this case, flatness can be enhanced by increasing the number of delay circuits connected in parallel.

In this embodiment, the delay time of the delay circuit 2A is the longest, then follows the delay time of the delay circuit 2B, and the delay time of the delay circuit 2C is the shortest. The delay circuits 2A, 2B and 2C vary in delay time, but are totally identical with respect to construction. Accordingly, for the delay circuits 2B and 2C, only the numbers of multipliers, registers, and memories are shown, and the construction of the delay circuit 2A alone is detailed.

In the first reverberation tone forming section 2 of such configuration, the amplitude data x(t−j) time j before, which has passed the band-pass filter BPF, is first multiplied by an amplitude level control factor K17 at a multiplier M17. The resultant product K17·x(t−j) is temporarily stored in a register R5 of the multiplier M17. Then, to read the amplitude data x(t−α1) loaded time α1 before, to a memory D1 having 2048-word memory addresses, an address of the memory D1 corresponding to delay time α1 is designated. Now, the amplitude data x(t−α1) time α1 before is read from the memory D1. This amplitude data x(t−α1) is fed to an adder SUM2, added to output data of other memories D2 and D3, and output data of memories D4 to D6 and D7 to D9 of the delay circuits 2B and 2C at the adder SUM2, and temporarily stored in a register R11 of the adder SUM2. In this case, READ operation of memories D1 to D9 is sequentially performed on the time-sharing basis from the memory D1 to the memory D9. During READ operation of the memory D1, no data is output from the memories D2 to D9. Accordingly, the content to be loaded to the register R11 of the adder SUM2 is the data x(t−α1) read from the memory D1.

The amplitude data x(t−α1) thus read from the memory D1 is multiplied by the amplitude level control factor K18 at a multiplier M18, and returned to the input of the memory D1. The product K18·x(t−α1) is added to the data K17·x(t−j) temporarily stored in the register R5 at the current time t, and the resultant value, K17·x(t−j)+K18·x(t−α1) is temporarily stored in a register R6. Then, the amplitude data [K17·x(t−j)+K18·x(t−α1)] stored in the register R6 is loaded to the same address where the amplitude data x(t−α1) time α1 before has been stored. Thereafter, the content of the register R6 is reset. The content of the register R6 is reset, because the register R6 is used for the next stage memory D2 processing.

When the processing of the memory D1 system is completed, the processing of a memory D2 system is performed similarly.

That is, to read the amplitude data x(t−α2) loaded time α2 before to the memory D2 having 2048-word addresses, an address of the memory D2 corresponding to delay time α2 is designated. Now, the amplitude data x(t−α2) sampled time α2 before is read from the memory D2. This amplitude data x(t−α2) is added to the content (the content read from the memory D1) x(t−α1) of the register R11 at the adder SUM2, and the resultant sum [x(t−α1)+(t−α2)] is temporarily stored in the register R11.

On the other hand, the amplitude data x(t−α2) read from the memory D2 is multiplied by an amplitude level control factor K18 at a multiplier M19, and returned to the input of the memory D2. The product K19·x(t−α2) is added to value K17·x(t−j) temporarily stored in the register R5, and the sum [K17·x(t−j)+K19·x(t−α2)] is temporarily stored in the register R6. Data [K17·x(t−j)+K19·x(t−α2)] thus stored in the register R6 is stored at the address where the data x(t−α2) time α2 before has been stored. Thereafter, the content of the register R6 is reset.

Subsequently, the processing of a memory D3 system is performed similar to the processing of the memory D2 system.

Accordingly, at the time when the memory D1 to D3 systems have been processed, if delay time of the memory D3 system is α3, the content to be stored in the register R11 is $$x(t-\alpha 1)+x(t-\alpha 2)+x(t-\alpha 3)$$

and the content to be stored in the memory D3 is $$K17\cdot x(t-j)+K20\cdot x(t-\alpha 3).$$

Such processing is performed in the delay circuits 2B and 2C similarly.

Accordingly, when delay times of memory D4, D5, and D6 systems in delay circuit 2B are represented by α4, α5, and α6 respectively, and delay times of memory D7, D8 and D9 systems in the delay circuit 2C are expressed by α7, α8, and α9 respectively, the content of the register R11 at the time when all processings of the delay circuits 2A to 2C have been completed becomes as follows:

$$RVD1 = \sum_{m=1}^{10} x(t - am)$$

$$= x(t-\alpha 1) + x(t-\alpha 2) + x(t-\alpha 3) + x(t-\alpha 4) +$$

-continued $$x(t-\alpha 5) + x(t-\alpha 6) + x(t-\alpha 7) + x(t-\alpha 8) + x(t-\alpha 9).$$

Figure 12:
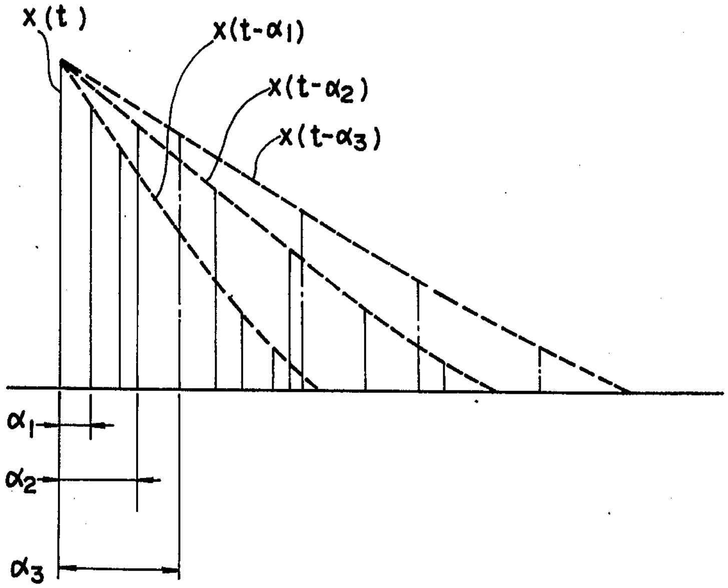
FIG. 12 and FIG. 13 are characteristic diagrams of reverberation tones produced by the example of FIG. 9.

As a result, subsequent to the initial echo, reverberation tones characterized by a large delay time spacing and regularly changing amplitude level and delay time as shown in FIG. 12 may be obtained. Since the time factor becomes complex, FIG. 12 illustrates reverberation tones of the delay circuit 2A only.

The reverberation tone data RVD1 with a large delay time spacing formed as above is fed to a second reverberation tone forming section 3.

The second reverberation tone forming section 3 has delay circuits 3A, 3B and 3C of all-pass type filter configuration provided in series, which is characterized by flat frequency response.

Three delay circuits 3A, 3B and 3C are provided in series so as to form a reverberation tone data RVD2 having delay time spacing smaller than the reverberation tone data RVD1 to be obtained by the first reverberation tone forming section 2. Accordingly, the delay time of echo of the delay circuits 3A, 3B and 3C of the second reverberation tone forming section 3 is set so as to be shorter than the delay time of each of the delay circuits 2A, 2B and 2C. The delay circuits 3A, 3B and 3C differ only in the delay time setting, and individual compositions are all identical. Therefore, in FIG. 9, only multiplier, register, and memory numbers are shown for the delay circuits 3B and 3C, and the delay circuit 3A alone is detailed.

First, the reverberation tone data RVD1 outputted from the first reverberation tone forming section 2 is fed to a register R12 of the delay circuit 3A. For reading the data RVD1(t−β1) loaded to a memory MD0 having 512-word memory addresses time β1 before before storing the above data RVD1 in the register R12, an address of the memory MD0 corresponding to delay time β1 is designated. Now, the data RVD1(t−β1) loaded time β1 before is read. Then, this data RVD1(t−β1) is multiplied by an amplifier level control factor K30 at a multiplier M30, and resultant product K30·RVD1(t−β1) is returned to the input of the memory MD0. Then, this feedback data K30·RVD1(t−β1) is added to the data RVD1(t) supplied from the first reverberation tone forming section 2 at the current time t, and the resultant sum [RVD1(t)+K30·RVD1(t−β1)] is stored in the register R12 temporarily. Then, the address of the memory MD0 corresponding to delay time β1 is designated again, the data RVD1(t−β1) loaded from the memory MD0 time β1 before is read again, and this data RVD1(t−β1) is stored in a register R13 temporarily. Then, the data [RVD1(t)+K30·RVD1(t−β1)] temporarily stored in the register 12 is multiplied by an amplitude control constant K29 at a multiplier M29. The resultant product $$K29\cdot\{RVD1(t)+K30\cdot RVD1(t-\beta 1)\}$$

is added to the value RVD1(t−β1) temporarily stored in the register R13, and the resultant sum $$RVD1(t-\beta 1)+K29\cdot\{RVD1(t)+K30\cdot RVD1(t-\beta 1)\}$$

is stored in the register R13 temporarily. Then, for using data [RVD1(t)+K30·RVD1(t−β1)] at a sampling time (t+β1) delayed by time β1 from the current time t, this data [RVD1(t)+K30·RVD1(t−β1)] is loaded to the address where the data RVD1(t−β1) time β1 before has been stored.

As the processing by the delay circuit 3A is completed in this manner, data $$RVD1(t-\beta1)+K29\cdot\{RVD1(t)+K30\cdot RVD1(t-\beta1)\}$$

stored in the register R13 is sent to the delay circuit 3B, and similar processing as in the case of the delay circuit 3A is performed at the delay circuit 3B.

Now, if output data of the delay circuits 3A, 3B and 3C are represented by RVD2A, RVD2B and RVD2C respectively, and delay times of the delay circuits 3B and 3C are expressed by β2 and β3 respectively, output data of registers R13, R15 and R17 of the delay circuits 3A, 3B and 3C can be given by the following Equations (13) through (15).

$$RVD2A=RVD1(t-\beta1)+K29\cdot\{RVD1(t)+K30\cdot RVD1(t-\beta1)\} \quad (13)$$

$$RVD2B=RVD2A(t-\beta2)+K31\cdot\{RVD2A(t)+K32\cdot RVD2A(t-\beta2)\} \quad (14)$$

$$RVD2C=RVD2B(t-\beta3)+K33\cdot\{RVD2B(t)+K34\cdot RVD2B(t-\beta3)\} \quad (15)$$

And, the output data RVD2C of the delay circuit 3C is output via the switch circuit SW as a data for generating a reverberation tone subsequent to the initial echo.

Figure 13:
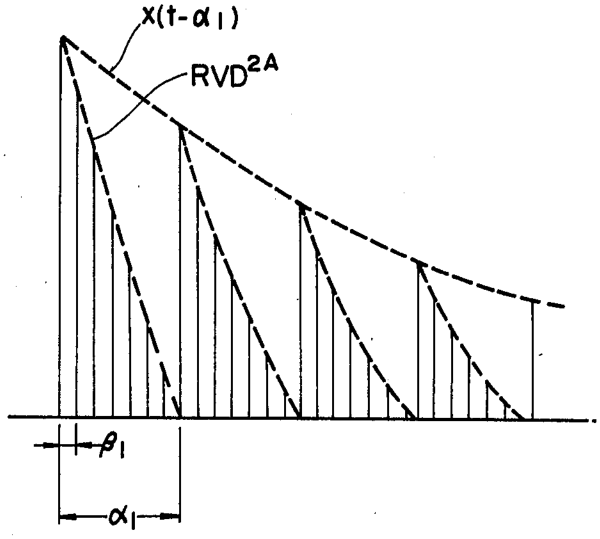

When the delay times of the delay circuits 3A, 3B and 3C are set so as to be $$\beta1>\beta2>\beta3,$$

reverberation tones of a small delay time spacing as shown in FIG. 13 may be formed. That is, based on the reverberation tone data RVD1 having a large delay time spacing formed at the first reverberation tone forming section 2, the delay circuit 3A forms the first reverberation tone data RVD2A at a delay time spacing β1 shorter than the delay time spacing of the first reverberation tone forming section 2, and the delay circuit 3B forms the second reverberation tone data RVD2B at a time spacing β2 shorter than delay time spacing β1. In this manner, as the reverberation tone forming at the delay circuits 3A to 3C proceeds, a reverberation tone with a short delay time spacing is formed.

Incidentally, the registers R12, R14 and R16 of the delay circuits 3A, 3B and 3C can be used in common on the time-sharing basis after the processing of their own circuits are completed, since those registers are not used until the next sampling period.

Figure 14:
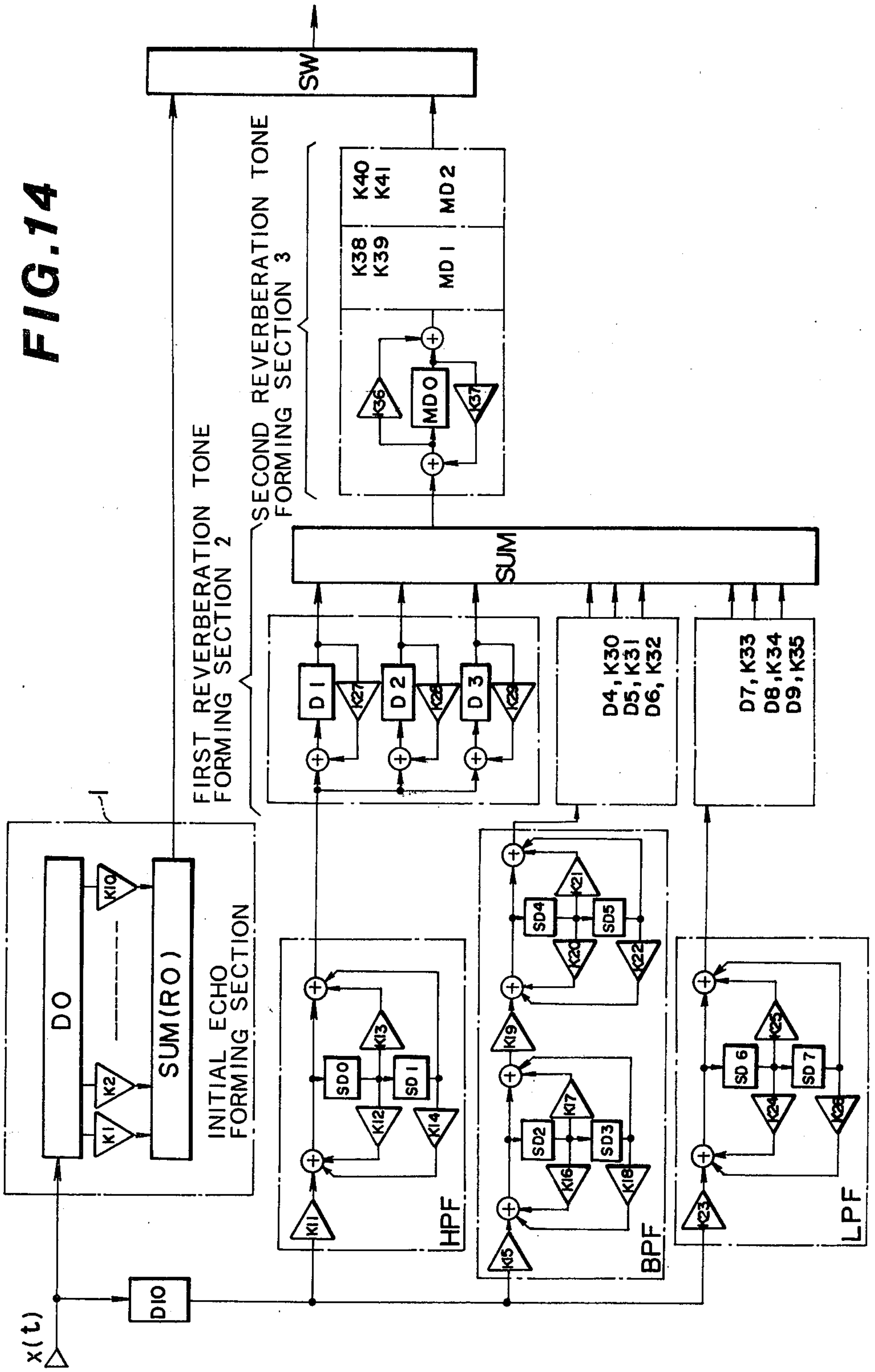
FIG. 14 is a functional block diagram of another example of the reverberation tone forming circuit.

Though the band-pass filter BPF is provided in the embodiment of FIG. 9, it may be omitted as required. Moreover, it may be so designed as shown in the functional block diagram of FIG. 14 that the output data of the memory D10 is divided into three frequency bands by a high-pass filter HPF, a band-pass filter BPF, and a low-pass filter LPF, and different reverberation tones are formed corresponding to individual frequency bands at a first reverberation tone forming section 2. The above can be realized simply by changing the content of the control program.

Now, an example of actual configuration of the sound effect imparting device for the realization of modulation and reverberation effects of desired characteristics by structuring a digital filter and reverberation tone forming circuit of optional construction will be described.

Actual Configuration of a Sound Effect Imparting Device

Figure 15:
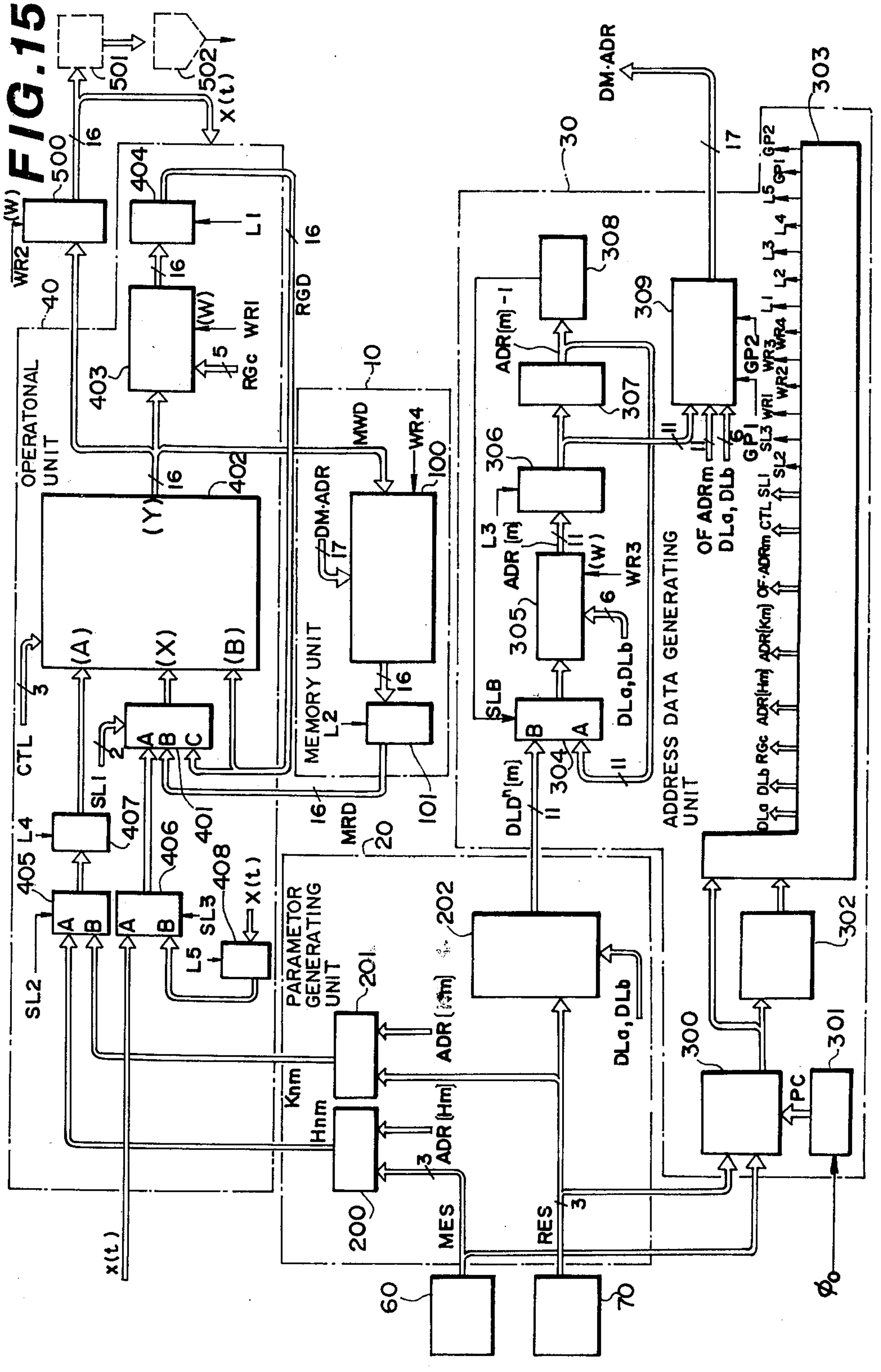
FIG. 15 is a block diagram of an embodiment of the sound effect imparting device of this invention.

FIG. 15 is a block diagram showing a typical configuration of the sound effect imparting device according to this invention. The device is largely divided into a memory unit 10, a parameter generating unit 20, an address data generating unit 30, and an operational unit 40.

Figure 16:
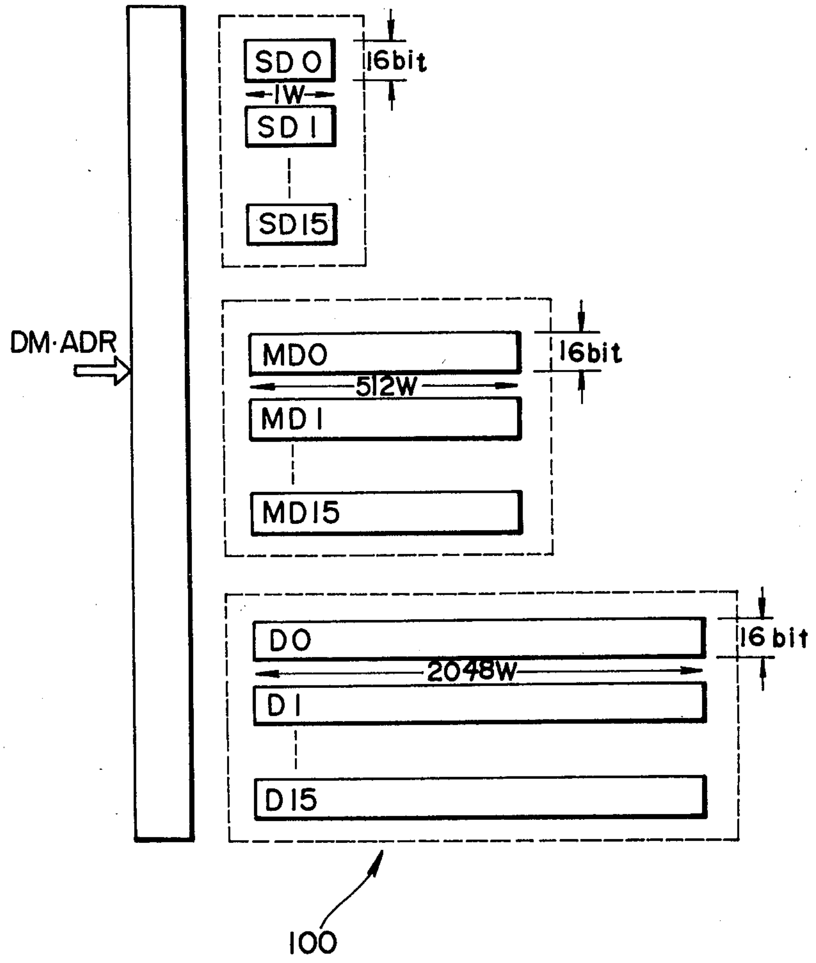
FIG. 16 shows the data memory structure of the embodiment shown in FIG. 15.

The memory unit 10 is for a delay element of optional delay time i·T0 (i=1, 2, . . . . ) by bringing one-word address to correspond with delay time T0, and is comprised of a data memory 100 and a latch 101. In the data memory 100 are provided, utilizing a plurality of memory blocks, one-word (16 bits) memories SD0 to SD15, 512-word (16 bits/word) memories MD0 to MD15, and 2048-word (16 bits/word) memories D0 to D15 (refer to FIG. 16). Data to be stored in the memories SD0 to SD15, MD0 to MD15, and D0 to D15 are provided from the operational unit 40, data memory address and read address are designated by address data MD·ADR to be output from the address data generating unit 30, and data read from the individual memories SD0 to SD15 are fed to the operating unit 40 via the latch 101.

The parameter generating unit 20 is for outputting a modulation coefficient Hnm (n: the kind of modulation effect, m: the number of coefficient H) for obtaining the modulation effect of desired characteristic as well as for outputting a reverberation coefficient Knm (n: the kind of reverberation characteristic, m: the number of coefficient K) and a delay length data DLDn[m] (n: the kind of reverberation characteristic, m: memory D0 to D15, MD0 to MD15). The parameter generating unit 20 is provided with a modulation coefficient memory 200, a reverberation coefficient memory 201, and a delay length data memory 202.

The modulation coefficient memory 200 has eight memory blocks corresponding to eight kinds of modulation effects selectable at a modulation effect selecting circuit 60, and a set of the modulation coefficient Hnm required for obtaining a predetermined modulation effect are stored in each memory block in advance. A 3-bit modulation effect selection data MES indicating the kind (n) of selected modulation effect is supplied from the modulation effect selecting circuit 60 as an address signal, and an address data ADR[Hm] indicating the number (m) of the modulation coefficient Hnm is supplied from the address data generating unit 30. Thereupon, the modulation coefficient Hnm stored at the address designated by the data ADR[Hm] allocated to the memory block designated by the modulation effect selection data MES is read and fed to the operating unit 40.

The reverberation coefficient memory 201 is structured similar to the modulation coefficient memory 200 described above and has eight memory blocks corresponding to eight kinds of reverberation effects having different reverberation characteristic which can be selected by a reverberation effect selecting circuit 70, and a set of the reverberation coefficients Knm required for obtaining a predetermined reverberation effect are stored in individual memory blocks in advance. As a 3-bit reverberation effect selection data RES indicating the kind (n) of the reverberation effect selected at the reverberation effect selecting circuit 70 is supplied from the circuit 70, the reverberation coefficient Knm stored at the address designated by the data ADR[Km] allocated to the memory block designated by the reverberation effect selection data RES is read and fed to the operating unit 40.

Figure 17:
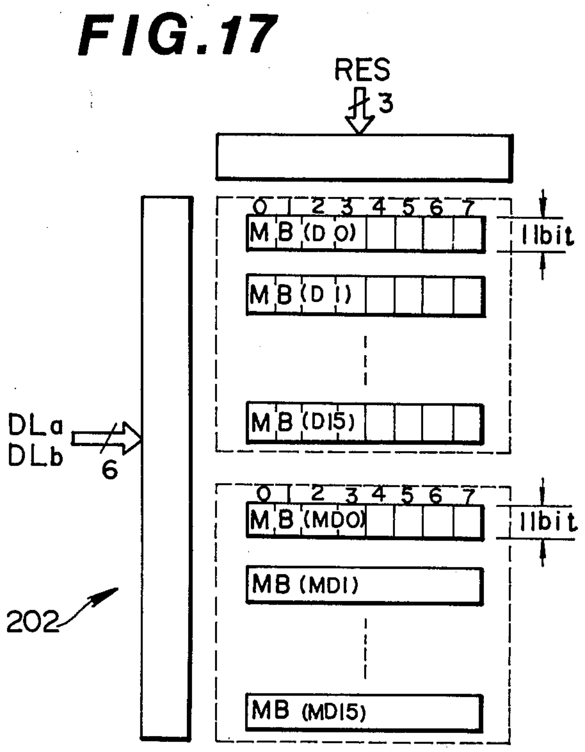
FIG. 17 shows the delay length data memory structure of the embodiment of FIG. 15.

The delay length data memory 201 is, as shown in FIG. 17, provided with memory blocks MB(D0) to MB(D15), and MB(MD0) to MB(MD15) corresponding to the data delay memories D0 to D15, and MD0 to MD15 (FIG. 16) respectively. Each of the memory blocks MB(MD0) to MB(MD15) has eight memory addresses "0" to "7" corresponding to eight kinds of reverberation effects, and a different delay length data DLDn[m], i.e., any of DLD1[D0] to DLD8[D0], DLD1[D1] to DLD8[D1], . . . DLD1[D15] to DLD9[D15], DLD1[MD0] to DLD8[MD0], . . . DLD1[MD15] to DLD8[MD15], is stored in each memory address "0" to "7" of each memory block MB(D0) to MB(MD15). As the reverberation effect selection data RES indicating the kind (n) of selected reverberation effect is supplied from the reverberation effect selecting circuit 70 is supplied as a lower address data, and a 4-bit memory number data DLa (a: 0 to 15) designating memory number 0 to 15 of memory MD0 to MD15, D0 to D15 and a 2-bit memory category data DLb (b: D, MD, SD) designating memory category D, MD or SD is supplied from the address data generating unit 30 as an upper address data, a delay length data DLDn[m] stored at the address (one of "0" to "7") designated by the data RES of the memory block (one of MB(MD0) to MB(MD15)) designated by the data DLa and DLb is read, and fed to the address data generating unit 30 as a data defining the delay time of a reverberation tone. Regarding the memories SD0 to SD15, since delay time is fixed (1·T0), no delay length data for memories SD0 to SD15 is required.

The address data generating unit 30 generates address data DM·ADR of the data memory 100 based on the delay length data DLDn[m]outputted from the parameter generating unit 20, the modulation effect selection data MES outputted from the modulation effect selecting circuit 60, the reverberation effect selection data RES outputted from the reverberation effect selecting circuit 70, and master clock pulse $\phi$0 defining the period of one step of the control program, and also generates various control signals for controlling circuit operation of each unit. The address data generating unit 30 is provided with a program memory 300, a program counter 301, a program decode memory 302, a control signal output register 303, a selector 304, an address counter 305, a latch 306, a subtraction circuit 307, a maximum value detecting circuit 308, and an address data output circuit 309.

In the program memory 300, a total of 16 different control programs are stored in advance so as to be able to form eight kinds of modulation effects and eight kinds of reverberation tones, and the kind of control program to be output is designated by the modulation effect selection data MES and the reverberation effect selection data RES. The content of the control program thus designated is read step by step by the output data PC of the program counter 301 which counts a master clock pulse $\phi$0.

The control program of each step includes the memory number data DLa, the memory category data DLb, a register number data RGc, coefficient read address data ADR[Km] and ADR[Hm], a memory D0 offset address data OF·ADRm, and operation code OPC consisting of a plurality of bits which is for performing operation control and write control of the memory and the latch. The data DLa, DLb, RGc, ADR[Km], ADR[Hm] and OF·ADRm are directly output through the control signal output register 303, while the operation code OPC is decoded at the program decode memory 302 into an operation control signal CRL, select control signal SL1 to SL3, write control signal WR1 to WR4, latch control signal L1 to L5, and control pulse GP1, GP2, and then output from the control signal output register 303.

Figure 18:
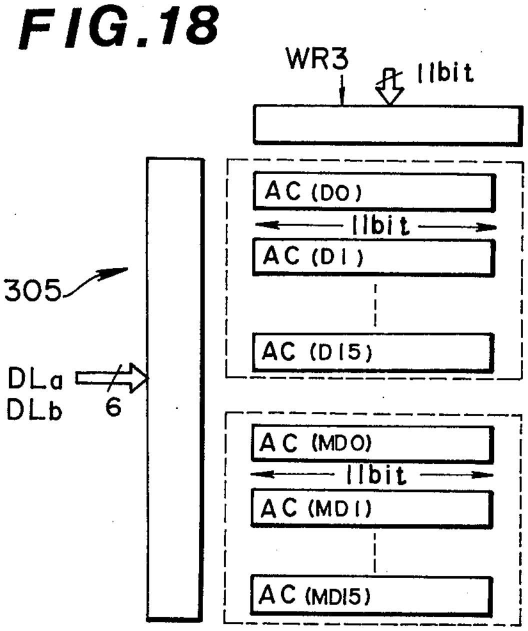
FIG. 18 shows the address counter structure of the embodiment of FIG. 15.

The address counter 305 is, as shown in FIG. 18, provided with address counters AC(D0) to AC(D15), and AC(MD0) to AC(MD15) which correspond to the delay memories D0 to D15, and MD0 to MD15 respectively. The individual counters AC(D0) to AC(D15) and AC(MD0) to AC(MD15) of this address counter 305 are selectively actuated by the memory number data DLa and the memory category data DLb. The count output data ADR[m] (m: D0 to D15, MD0 to MD15) of the address counter actuated by the data DLa and DLb is fed to the address data output circuit 309 via the latch 306, and also fed to the subtraction circuit 307. In this case, since the memories D0 to D15 have the address length of 2048 words, the output data ADR[m] of the address counter AC(m) is made up of 11 bits so as to allow designation of address up to 2048 words. The address counter 305 consists of a random access memory.

The subtraction circuit 307 subtracts "1" from the output content ADR[m] of the address counter AC(m) which is fed via the latch 306, and returns the resultant value [ADR[m]−1] to the A side input of the selector 304 to be used in the next sampling period (t+1). This value [ADR[m]−1] is also fed to the maximum value detecting circuit 308. The maximum value detecting circuit 308 corresponds to the detecting circuit MXD in FIG. 7. Upon detecting that data [ADR[m]−1] obtained by subtracting "1" from the output data ADR[m] of the address counter AC(m) designated by the memory number data DLa and the memory category data DLb has become the maximum value (every bit is "1"), the maximum value detecting circuit 308 outputs a select control signal SLB for causing to select the B side input of the selector 304. The output data [ADR[m]−1] of the subtraction circuit 307 is fed to the A side input of the selector 304, the output data DLDn[m] of the delay length data memory 201 is fed to the B side input of the selector 304, and the output of the selector 304 is fed to the data input of the address counter 305, thereafter being loaded to the address counter AC(m) designated by the data DLa and DLb on the write control signal WR3. Accordingly, the value [ADR[m]−1] obtained by subtracting "1" from the current value ADR[m] is loaded to the address counter AC(m) designated by the data DLa and DLb at each sampling period unless the select control signal SLB is generated from the maximum value detecting circuit 308, and the output data ADR[m] decreases to "0" with time. As the value [ADR(m)−1] becomes the maximum value, the select control signal SLB is generated from the maximum value detecting circuit 308, with the resultant feeding and loading of the delay length data DLDn[m] to the address counter AC(m) via the selector 304. Accordingly, the content of the address counter AC(m) changes toward "0" as the sampling time elapses after the delay length data DLDn[m]is fed upon the generation of the select control signal SLB. That is, in the portion comprised of the selection 307, the address counter 305, the latch 306 the subtraction circuit 307, address the maximum value detecting circuit 308, the address data ADR[m] which makes a round at a period equal to the delay time corresponding to the delay length data DLDn[m] is formed at the address counter AC(m) designated by the data DLa and DLb.

This address data ADR[m] is fed to the address data output circuit 309.

The address data output circuit 309 is for outputting address data for data read and write for the memories SD0 to SD15, D0 to D15, and MD0 to MD15. For example, when forming an intial echo ECH(t) by reading data delayed by time im from the memory D0, this address data output circuit 309 takes the sum of the address data ADR[D0] regarding the memory D0 and 11-bit offset address data OF·ADRm (=OF·ADR1−OF·ADR10: output of the control signal output register 303) which corresponds to each delay time im of the first echo ECH1 to the tenth echo ECH10 as a lower address data, the memory number data DLa and the memory category data DLb are added to the upper part thereof, and a set of data thus obtained is output as an address data DM·ADR. On the other hand, when the amplitude data x(t) sampled at the current time t is to be loaded to the memory D0, DLa ($=DL_0$) and DLb ($=DL_D$) designating the memory D0 are prefixed to output data ADR[D0] of address counter AC(D0) corresponding to memory D0 (this is taken as lower address data), and a set of data thus obtained is output as the address data DM·ADR. Moreover, when performing WRITE and READ operations with respect to the memories SD0–SD15, all bits of lower address data are set to "0" the data DLa ($=DL_0-DL_{15}$) and DLb ($=DL_{SD}$) designating the memory SD0–SD15 are prefixed thereto, and a set of data thus obtained is output as the address data DM·ADR. For forming the reverberation tones RVD1 and RVD2, each output data ADR[D1] to ADR[D15], ADR[MD0] to ADR[MD15] of the address counter AC(D1) to AC(D15), AC(MD0) to AC(MD15) corresponding to each of the memories D1 to D15 and MD0 to MD15 is set as a lower address data, the data DLa and DLb are prefixed thereto, and a set of data thus obtained is output as address data DM·ADR. In this case, when data ADR[m]+OF·ADRm is to be suffixed to the data DLa and DLb, the control pulse GP1 is output from the control signal output register 303. When all bits of lower address data are to be set to "0", the control pulse GP2 is output from the control signal output register 303.

Incidentally, the address data output circuit 309 has a register for temporarily storing the data DLa and DLb.

The operating unit 40 is for performing amplitude level control of data to be stored in the memories D0 to D15, MD0 to MD15, and SD0 to SD15, and data read from each memory, and is provided with selectors 401, 405 and 406 an arithmetic circuit 402 a temporary register 403, and latches 404, 407 and 408.

In the selector 401, the amplitude data x(t) of a digital musical tone signal and the amplitude data X(t) provided with a first effect are selectively fed to the A side input via the selector 406, read the data MRD from the memory unit 10 is fed to the B side input, and output the data RGD of the temporary register 403 is fed to the C side input via the latch 404. Any one of these input data x(t), X(t), MRD, and RGD is selected by a 2-bit select control signal SL1 from the control signal output register 303, and is fed to the operation input (X) of the arithmetic circuit 402.

In the arithmetic circuit 402, the coefficient Hnm or Knm is selectively fed to the operation input (A) through the selector 405 and the latch 407, the output data RGD of the temporary register 403 is fed to the operation input (B), and selected output data (x(t), X(t), MRD, RGD) of the selector 401 is fed to the operation input (X). This circuit 402 performs calculations as follows by a 3-bit operation control signal CTL from the control signal output register 303.

$$(Y)=(A)\cdot(X)+(B)$$

$$(Y)=(X)+(B)$$

$$(Y)=(X)$$

$$(Y)=(B)$$

$$(Y)=(0)$$

The resultant value (Y) is fed to the temporary register 403, the memory unit 10, and an output register 500.

The temporary register 403 stores the value (Y) of the arithmetic circuit 402 in the digital filter processing stage or in the forming stage of initial each ECH(t), and the reverberation tones RVD1 and RVD2 temporarily, and returns the memory content to the C side input of the selector 401 and the operation input (B) of the arithmetic circuit 402 as a register output data RGD. For example, this temporary register 403 has 32 registers R0 to R31 which are subject to designation by a 5-bit register designation data RGc (c: 0–31), and input data is loaded to the register (R0–R31) specified by the data RGc according to the control of the write control signal WR1.

The selector 405 selects the modulation coefficient Hnm for the modulation effect read from the modulation coefficient memory 200 when the select control signal SL2 from the control signal output register 303 is "1", and supplies it to the latch 407. When then the signal SL2 is "0", the selector 405 selects the reverberation coefficient Knm for the reverberation effect read out from the reverberation coefficient memory 201 is selected and fed to the latch 407. The selector 406 selects the amplitude data x(t) when the select control signal SL3 from the control signal output register 303 is "1", and feeds it to the selector 401. When the signal SL3 is "0", the select 406 selects the amplitude data X(t) provided with a first effect, and feeds it to the selector 401.

The amplitude data X(t) provided with a first effect here means an input digital musical tone signal added with such modulation effect as vibrato effect through the processing (filter coefficient modulation) as described with reference to FIG. 1, and the amplitude data X(t) is one returned from the output register 500. This is used for superposing such second effect as reverberation effect to the amplitude data X(t) added with modulation effect.

The output register 500 stores the amplitude data X(t) regarding the modulation effect obtained as value (Y) of the arithmetic circuit 402 or the data ECH(t) and RVD(t) concerning the reverberation tone by the write control signal WR2, and outputs the data thus stored via an attenuator 501.

The operation of this configuration will now be described. The description here concerns the case where a modulation effect is first added within one sampling period of the digital musical tone signal, and then a reverberation effect is sequentially added on the time-sharing basis in addition to the modulation effect. In this case, it is assumed that a digital filter for adding a modulation effect is of such construction as shown in FIG. 1, and a reverberation tone forming circuit for adding a reverberation effect is of such construction as shown in FIG. 9. It is further assumed that the memory SD15 is used as the delay element DL of FIG. 1, the result of addition at the adder A1 of FIG. 1 is temporarily stored in the register R30 of register No.30 in the temporary register 403, and the result of addition of the adder A2 is temporarily stored in the register R31 of register No. 31. In addition, the multiplying factor of the multiplier M1 of FIG. 1, and that of the multiplier M2 are assumed to be "Hn1" and "−Hn2" respectively. In addition, both inputs of the adder A1 of FIG. 1 are assumed to be the add inputs (+).

First, the following steps (1) through (6) are executed to calculate $$y(t)=x(t)-Hn2\cdot y(t-1)$$

where x(t) is the amplitude data of input digital musical tone signal at the current time t, y(t−1) is the amplitude data before one sampling time (T0), and −Hn2 is a modulation coefficient, and to store value y(t) to the register R30 temporarily.

(1) First, the address data ADR[Hm]=ADR[H2] for reading the coefficient "[−Hn2]" is provided from the control signal output register 303 to the modulation coefficient memory 200, and the coefficient "−Hn2" is read. At this time, the select control signal SL2 of "1" and the latch control signal L4 are output from the control signal output register 303, and the coefficient "−Hn2" read out from the memory 200 is latched at the latch 407 via the selector 405, thereafter being fed to the operation input (A) of the arithmetic circuit 402.

(2) Then, for reading the amplitude data y(t−1) time T0 before from the memory SD15 of the data memory 100, the memory category data $DLb=DL_{SD}$, the memory number data DLa=DL15, and the control pulse GP2 are output from the control signal output register 303. As a result, the address data DM·ADR consisting of data $DL_{SD}$ and DL15 (both upper) and "0" (all lower bits), which indicates the memory SD15, is output from the address output circuit 309 to the data memory 100, and the amplitude data y(t−1) time T0 before stored in the memory SD15 is read out. The latch control signal L2 is also output from the control signal output register 303 at this time, and the amplitude data y(t−1) read out from the memory SD15 is latched at the latch 101.

The amplitude data y(t−1) is "1", because the delay time of the delay element DL of FIG. 1 is T0.

(3) Then, for multiplying the amplitude data y(t−1) temporarily stored in the latch 101 by the coefficient "−Hn2" temporarily stored in the latch 407, the select control signal SL1 for selectively outputting the B side select input of the selector 401 and the operation control signal CRL for executing the operation "(Y)=(A)·(X)" are output from the control signal output register 303.

As a result, the selector 401 supplies the amplitude data y(t−1) to the operation input (X) of the arithmetic circuit 402. The arithmetic circuit 402 executes the following.

$$(Y)=(A)\cdot(X)=-Hn2\cdot y(t-1)$$

(4) Then, for temporarily storing the calculated value $$(Y)=-Hn2\cdot y(t-1)$$

of the arithmetic circuit 402 in the register R30 of the temporary register 403, the register number data RGc, where c=30, and the write control signal WR1 are output from control signal output register 303. As a result, the value (Y) obtained at the arithmetic circuit 402 is stored in the register R30 temporarily.

(5) Then, the content of the register R30, [−Hn2·y(t−1)], is added to the amplitude data x(t) at the current time t, and the resultant value is re-stored in the register R30. For this purpose, for transferring, the content of the register R30, [−Hn2·y(t−1)], to the latch 404, the register number data RGc, where c=30, and the latch control signal L1 are output from the control signal output register 303. Thereafter, the select control signal SL3 for selecting the A side select input of the selector 401, the select control signal SL3 for selecting the A side select input of the selector 406, and the operation control signal CTL for executing the operation "(Y)=(X)+(B)" are output from the control signal output register 303.

As a result, the selector 401 supplies the amplitude data x(t) to the operation input (X) of the arithmetic circuit 402. This circuit 402 also executes the following.

$$(Y)=(X)+(B)=x(t)-Hn2\cdot y(t-1)$$

(6) Then, for storing the value (Y) in the register R30, the register number data RGc, where c=30, and the write control signal WR1 are output from the control signal output register 303, similar to the above step (4). As a result, a calculated value expressed by $$y(t)=x(t)-Hn2\cdot y(t-1)$$

is stored in the register R30. In order to use this value at the next sampling time (t+1), the address data DM·ADR indicating the memory SD15 is output from the address data output circuit 309 in the same manner as the above step (2), and the write control signal WR4 is output from the control signal output register 303, thereby loading said calculated value to the memory R15 of the data memory 100.

Then, the calculation X(t)=Hn1·y(t)+y(t−1) is performed. For temporarily storing the resultant value X(t) in the register R31 of the temporary register 403, and for outputting said value X(t) thereafter via the output register 500, subsequent steps (7) through (14) are executed.

(7) For executing the operation [y(t)·Hn1], the register number data RGc, where c=30, and the latch control signal L1 are output from the control signal output register 303, and the content of the register R30, [y(t)=x(t)−Hn2·y(t−1)], is read and transferred to the latch 404. In addition, the address data ADR[Hm]−ADR[H1], the select control signal SL2 for selecting the A side input of the selector 404, and the latch control signal L4 are output from the control signal output register 303, and the coefficient Hn1 is read out from the modulation coefficient memory 200 and latched by the latch 407 via the selector 405.

(8) Then, the select control signal SL1 for selecting the C side input of the selector 401, and the operation control signal CTL for executing the operation [(Y)=-(A)·(X)] are output from the control signal output register 303.

As a result, the selector 401 selects the output data y(t) of the latch 404, and supplies the same to the operation input (X) of the arithmetic circuit 402. The arithmetic circuit also executes the following operation.

$$(Y)=(A)\cdot(X)-Hn1\cdot y(t)$$

(9) Then, for temporarily storing the resultant value (Y) in the register R31, the register number data RGc, where c=31, and the write control signal WR1 are output from the control signal output register 303. As a result, the value [(Y)=Hn1·y(t)] obtained at the arithmetic circuit 402 is stored in the register R31.

(10) Then, for the addition of the content of the register R31, i.e., [Hn1·y(t)], and the data y(t−1) time T0 before, the content [Hn1·y(t)] of the register R31 is read out and transferred to the latch 404 in the same manner as the above step (7), and the select control signal SL1 for selecting the B side input and the operation control signal CTL for executing the operation [(Y)=(X)+(B)] are output from the control signal output register 303.

As a result, the selector 401 selects data y(t−1) latched at the latch 101, and supplies the same to the operation input (X) of the arithmetic circuit 402. The arithmetic circuit 402 also executes the following.

$$(Y)=(X)+(B)=y(t-1)+Hn1\cdot y(t)$$

The above operation result is stored in the register R31 in the same manner as the above step (9). As a result, the data X(t) given by the following is stored in the register R31.

$$X(t)=y(t-1)+Hn1\cdot y(t)$$

(11) Then, for outputting the content X(t) of the register R31, after the content X(t) of the register R31 has been transferred to the latch 404 in the same manner as the above step (7), the operation control signal CTL for causing to execute the operation [(Y)=(B)] is output from the control signal output register 303.

As a result, the arithmetic circuit 402 executes the following.

$$(Y)=(B)=X(t)=y(t-1)+Hn1\cdot y(t)$$

(12) Then, a write control signal WR2 is output from the control signal output register 303, and the operation result (Y) at the arithmetic circuit 402 is stored in the output register 500. As a result, the output register 500 sends out an output data expressed by $$X(t)=y(t-1)+Hn1\cdot y(t)$$

In this case, if Hn1=Hn2, an output data x(t), equal to the aforementioned Equation (1) is sent out. That is, the digital musical tone signal X(t) is sent out.

(13) Then, in order to use the data X(t) stored in the output register 500 for the later-mentioned reverberation tone forming, the latch control signal L5 is output from the control signal output register 303, and the data X(t) is latched at the latch 408.

Thereafter, the above operations are performed at each sampling time slot.

Then, the reverberation effect is added to data X(t) provided with the modulation effect as shown above, in the following manner.

a. Initial Echo Forming Operation

For Forming Initial Echo ECH(t)

(1) First, in order to load the amplitude data x(t) of musical tone provided with the modulation effect at the current time (t) to the memory D0 of the data memory 100, the select control signals SL1 and SL3, and the operation control signal CTL of the content as shown below are output from the control signal output register 303.

SL1:SELECT (A)
SL3:SELECT (B)
CTL:(Y)=(X)

As a result, the selector 406 selects the amplitude data X(t) provided with the modulation effect stored in the latch 408, and supplies the same to the operation input (X) of the arithmetic circuit 402 via the selector 401. On the other hand, the arithmetic circuit 402 outputs the amplitude data X(t) fed to the operation input (X) as an operation value (Y).

(2) Then, for loading output data X(t) of the arithmetic circuit 402 to the address of the memory D0 corresponding to the current sampling time (t) upon designation, signals DLa to L3 of the content shown below are output from the control signal output register 303.

DLa:$DL_0$
DLb:$DL_D$
WR4:"1" (WRITE)
L3:"1" (LATCH)

As a result, the output data ADR[D0] of the address counter AC(D0) corresponding to the memory D0 is latched at the latch 306 as a lower address data for loading the amplitude data at the current time (t). The memory number data DLa (=$DL_0$) and the memory category data DLb (=$DL_D$) are prefixed to the lower address data ADR[D0] thus latched at the address data output circuit 309, and a set of data thus formed is output as a write address data DM·ADR of amplitude data X(t) for the memory D0. As a result, the amplitude data x(t) at the current time (t) having been supplied to the data input of the data memory 100 via the arithmetic circuit 402 is loaded to the address which corresponds to the current time (t) on the write control signal WR4.

(3) Then, for clearing the register R0 which stores a combined value of initial echoes at every sampling time, signals RGc to WR1 of the content given below are output from the control signal output register 303.

RGc:R0
CRL:(Y)=0
WR1:"1" (WRITE)

As a result, "0" is loaded to the register R0, i.e., the register R0 is cleared.

(4) Then, for forming a first echo ECH1, signals OF·ADRm to L2 of the content shown below are output from the control signal output register 303.

OF·ADRm:OF·ADR1
DLb:$DL_D$
GP1:"1"
La:"1" (LATCH)

In this case, the address data output circuit 309 retains the memory number data DLa (=$DL_0$) of the above step a-(2).

As a result, the address data output circuit 309 adds address data ADR[D0] latched at the latch 306 to address data OF·ADR1 which corresponds to delay time il, and outputs a set of the lower address data which is the sum of the above addition and the upper address data which is composed of the memory number data DLa (=$DL_0$) and the memory category data DLb (=$DL_D$) as an address data DM·ADR for reading the amplitude data $X(t-il)$ loaded from the memory D0 time il before. As a result, the amplitude data $X(t-il)$ time il before is read out from the memory D0, and the data $X(t-il)$ thus read is latched at the latch 101 on the latch control signal L2.

(5) Then, for transferring the current value of the register R0 to the latch 404, the signals RGc and L1 of the content shown below are output from the control signal output register 303.

RGc:R0
L1:"1"

As a result, the current value of the register R0 is transferred to the latch 404 and stored there.

(6) Then, in order to obtain an instantaneous value $Kn1 \cdot X(t-il)$ relative to the first echo ECH1 by multiplying amplitude data $X(t-il)$ time il before by the amplitude level control coefficient Km1, signals ADR[Km] to CTL of the content shown below are output from the control signal output register 303.

ADR[Km] : ADR[K1]
L4:"1" (LATCH)
SL1:SELECT (B)
SL2:SELECT (B)
CTL:(A)·(X)+(B)=(Y)

As a result, the coefficient Knl relative to the first echo ECH1 is read out from the coefficient memory 201, and fed to the operation input (A) of the arithmetic circuit 402. The selector 401 selects amplitude data $X(t-il)$ time il before, and feeds thus data $X(t-il)$ to the operation input (X) of the arithmetic circuit 402. The arithmetic circuit 402 execute the following operation.

$$(Y)=(A)\cdot(X)+(B)=Km1\cdot X(t-il)+[R0]$$

In this case, since the content of the register R0 has already been cleared in step a-(3), the instantaneous value $Kn1 \cdot X(t-il)$ regarding to the first echo ECH1 is here obtained as the value (Y).

(7) Then, for transferring and storing the instantaneous value $Kn1 \cdot X(t-il)$ of the first echo ECH1 in the register R0, signals R0 and WR1 of the content shown below are output from the control signal output register 303.

RGc:R0
WR1:"1" (WRITE)

As a result, output data $(X)=Kn1 \cdot X(t-il)$ of the arithmetic circuit 402 is loaded to the register R0.

As the steps shown above are completed, the instantaneous value $Kn1 \cdot X(t-il)$ of the first echo ECH1 can be obtained at the register R0.

(8) Then, instantaneous values $Kn2 \cdot X(t-i2)$ to $Kn10 \cdot X(t-i10)$ of the second echo ECH2 to the tenth echo ECH10 are formed in the same manner as steps a-(4) to a-(7).

(7). Accordingly, at the time when step a-(7) concerning the tenth echo ECH10 has completed, the sum of instantaneous values $$\sum_{m=1}^{10} Knm \cdot X(t-im)$$

of the first echo ECH1 to the tenth echo ECH10 can be obtained at the register R0. Said sum $$\sum_{m=1}^{10} Knm \cdot X(t-im)$$

is loaded to the output register 500 on a write control signal WR2, and transferred to the attenuator 501.

b. Filter operation (1) First, in order to read out the amplitude data $X(t-j)$ time j before from the memory D10, the signals DLa to L2 of the content shown below are output from the control signal output register 303.

DLa:DL10
DLb:$DL_D$
L3:"1" (LATCH)
L2:"1" (LATCH)

As a result, the output data ADR[D10] of the address counter AC(D10) corresponding to the memory D10 is latched at the latch 306 as a lower address data for reading the amplitude data $X(t-j)$ time j before. The memory number data DLa (=DL10) and the memory category data DLb ($=DL_D$) are prefixed to the lower address data ADR[D10] thus latched, and a set of data thus formed is output to the memory D10 of data memory 100 as a read address data DM·ADR of the amplitude data $X(t-j)$. As a result, the amplitude data $X(t-j)$ time j before is read and data $X(t-j)$ thus read is latched at the latch 101 on a latch control signal L2.

(2) Then, in order to load the amplitude data X(t) at the current time (t) to the same address as the read address of the amplitude data $X(t-j)$, signals SL1 to CTL of the content shown below are output from the control signal output register 303.

SL1:SELECT (A)
SL3:SELECT (B)
CTL:(Y)=(X)

As a result, the selector 401 supplies the amplitude data at the current time (t) to the operation input (X) of the arithmetic circuit 402. The arithmetic circuit 402 outputs the amplitude data X(t) thus fed to the operation input (X) as a value (Y).

(3) Then, in order to load the amplitude data X(t) to the memory D10, the signals DLa to L3 of the content shown below are output from the control signal output register 303.

DLa:DL10
DLb:$DL_D$
WR4:"1" (WRITE)
L3:"1" (LATCH)

As a result, the output data ADR[D10] of the address counter AC(D10) corresponding to the memory D10 is latched at the latch 306 as a lower address data for loading the amplitude data X(t) at the current time (t). The memory number data DLa (=DL10) and the memory category data DLb ($=DL_D$) are prefixed to the lower address data ADR[D10] thus latched at the address data output circuit 309, and a set of data thus formed is output as a write address data DM·ADR of the amplitude data X(t) in the memory D10. As a result, the amplitude data X(t) at the current time (t) provided to the data input of the memory D10 of the data memory 100 via the arithmetic circuit 402 is loaded to the address which corresponds to the current time (t), on the write control signal WR4.

(4) Then, in order to, in the low-pass filter, LPF, calculate $$[R1]+Kn11\cdot X(t-j)$$

where [R1] is the content of the register R1, Kn11 is a coefficient, and $X(t-j)$ is the amplitude data time j before, and to re-store the resultant value to the register R1, first signals RGc and L1 of the content shown below are output from the control signal output register 303.

RGc:R1
L1:"1" (LATCH)

The content of the register R1 is transferred to the latch 404.

(5) Then, in order to calculate Kn11·X(t−j), signals ADR[Km] to CTL of the content shown below are output from the control signal output register 303.

ADR[Km]:ADR[K11]
L4:"1" (LATCH)
SL1:SELECT (B)
SL2:SELECT (B)
CTL:(Y)=(A)·(X)+(B)

As a result, a coefficient Kn11 is read out from the reverberation coefficient memory 201, and is fed to the operation input (A) of the arithmetic circuit 402. On the other hand, the selector 401 selects the amplitude data X(t−j) latched at the latch 101 in step b-(1), and supplies the same to the operation input (X) of the arithmetic circuit 402. Then, the arithmetic circuit 402 performs the following.

$$(Y) = (A) \cdot (X) + (B)$$
$$= Kn11 \cdot X(t-j) + [R1]$$

In this case, since the content of the register R1 has already been cleared upon the completion of the filter processing at the previous sampling time (t−1), KN11·X(t−j) becomes (Y) in this step.

(6) Then, for storing the value (Y)=Kn11·X(t−j) in the register R1, signals RGc and WR1 of the content as shown below are output from the control signal output register 303.

RGc:R1
WR1:"1" (WRITE)

As a result, the output data Kn11·X(t−j) of the arithmetic circuit 402 is stored in the register R1.

(7) Then, in order to read out the amplitude data X(t−j−1) time (j−1) before from the memory SD0, signals DLa to L2 of the content shown below are output from the control signal output register 303.

DLa:DL0
DLb:$DL_{SD}$
GP2:"1"
L2:"1" (LATCH)

Then, the address data output circuit 309 sets all bits of the lower address data to "0", prefixes the memory number data DLa (=$DL_0$) and the memory category data DLb (=$DL_{SD}$) thereto, and outputs the data thus formed as an address data DM·ADR to the memory SD0. As a result, the amplitude data X(t−j−1) time (j−1) before is read from the memory SD0, and latched at the latch 101.

(8) Then, in order to calculate $$Kn12 \cdot X(t-j-1)+[R1]$$

where [R1] is the content "Kn11·X(t−j)" of the register R1, Kn12 is a coefficient, and X(t−j−1) is the amplitude data latched at the latch 101, and to re-store the resultant value to the register R1, first signals RGc and L1 of the content shown below are output from the control signal output register 303, and the content Kn11·X(t−j) of the register R1 is transferred to the latch 404.

RGc:R1
L1:"1" (LATCH)

(9) Then, for calculating Kn12·X(t−j−1)+[R1], signals ADR[Km] to CTL of the content shown below are output from the control signal output register 303.

ADR[Km]:ADR[K12]
L4:"1" (LATCH)
SL1: SELECT (B)
SL2: SELECT (B)
CTL: (Y)=(A)·(X)+(B)

As a result, the coefficient Kn11 is read from the coefficient memory 201, and is fed to the operation input (A) of the arithmetic circuit 402. On the other hand, the selector 401 selects amplitude data X(t−j−1) latched at the latch 101, and supplies the same to the operation input (X) of the arithmetic circuit 402. As a result, the arithmetic circuit 402 outputs the value (Y) resulted from the following operation.

$$(Y) = (A) \cdot (X) + (B)$$
$$= Kn12 \cdot X(t-j-1) + Kn11 \cdot X(t-j)$$

The value (Y) is stored in the registers R1 and R2 in the next step. As a result, the contents of the registers R1 and R2 become as follows:

$$[R1]=[R2]=Kn12 \cdot X(t-j-1)+Kn11 \cdot X(t \cdot j)$$

(10) Then, in order to perform operation of Kn13·X(t−j−1)+[R2], where [R2] is the content of register R2, Kn13 is a coefficient, and X(t−j−1) is the amplitude data time (j−1) before stored in the memory SD0, first the content Kn12·X(t−j−1)+Kn11·X(t−j) is transferred to the latch 404 in the same manner as step b-(8).

(11) Then, in order to perform the operation of Kn13·X(t−j−1)+[R2] by reading the coefficient Kn13, signals ADR[Km] to CTL of the content shown below are output from the control signal output register 303 in the same manner as step b-(9).

ADR[Km]:ADR[K13]
L4:"1" (LATCH)
SL1:SELECT (B)
SL2:SELECT (B)
CTL:(Y)=(A)·(X)+(B)

As a result, the arithmetic circuit 402 outputs the value (Y) obtained by the following operation.

$$(Y) = (A) \cdot (X) + (B)$$
$$= Kn13 \cdot X(t-j-1) + Kn12 \cdot X(t-j-l) + Kn11(t-j)$$

The value (Y) thus obtained is stored in the register R2 in the next step, and is fed to the high-pass filter HPF via the register R2. (12) In the last step of the low-pass filter LPF, for loading the content of the register R1 to the memory SD0, and using the same at the next sampling time (t+1), first the content "Kn12·X(t−j−1)+Kn11·X(t−j)" of the register R1 is transferred to the latch 404 in the same manner as step b-(8), then the arithmetic circuit 402 is caused to perform the operation of (Y)=(B), and the resultant value "(Y)=Kn12·X(t−j−1)+Kn11·X(t−j)" is loaded to the memory SD0. This write operation is performed by outputting signals DLa to WR4 of the content shown below from the control signal output register 303.

DLa:$DL_0$
DLb:$DL_{SD}$
GP2:"1"
WR4:"1" (WRITE)

After the completion of the operation of low-pass filter LPF, the operation of high-pass filter HPF is performed. The description of the operation of highpass filter HPF is omitted.

Now, the operation for forming reverberation tones RVD1 with a large delay length will be described.

c. Reverberation tone RVD1 forming operation (1) First, in order to multiply data X(t−j) stored in the register R4 of the high-pass filter HPF by a coefficient Kn17, and causing the register R5 to store the resultant value Kn17·X(t−j), signals RGc and L1 of the content shown below are output from the control signal output register 303.

RGc:R4
L1:"1" (LATCH)

The content X(t−j) of the register R4 is transferred to the latch 404.

(2) Then, in order to perform operation of Kn17·X(t−j), signals ADR[Km] to CTL of the content shown below are output from the control signal output register 303.

ADR[Km]:ADR[K17]
L4:"1" (LATCH)
SL1:SELECT (C)
SL2:SELECT (B)
CTL:(Y)=(A)·(X)

As a result, the arithmetic circuit 402 outputs the value (Y) resulted from the following operation.

$$(Y)=(A)\cdot(X)=Kn17\cdot X(t-j)$$

This value (Y) is stored in the register R5 in the next step.

(3) Then, in order to read the amplitude data X(t−α1) time α1 before from the memory D1 of the data memory 100, to add this data X(t−α1) to the current value of the register R11, and to cause the register R11 to store the sum thus obtained, signals DLa to L2 of the content shown below are output from the control signal output register 303.

DLa:DL1
DLb:$DL_D$
L3:"1" (LATCH)
L2:"1" (LATCH)

As a result, the output data ADR[D1] of the address counter AC(D1) corresponding to the memory D1 is latched at the latch 306 as a lower address data for reading the amplitude data X(t−α1). At the address data output circuit 309, the memory number data DLa and the memory category data DLb are prefixed to the lower address data ADR[D1], and a set of data thus formed is output to the data memory 100 as an address data DM.ADR of the memory D1. As a result, the amplitude data X(t−α1) time α1 before is read out from the memory D1, and latched at the latch 101.

(4) Then, in order to add the data X(t−α1) thus read and the current value of the register R11, the content of the register R11 is transferred to the latch 404, and then signals SL1 to CTL of the content shown below are output from the content signal output from the content signal output register 303.

SL1:SELECT (B)
STL:(Y)=(X)+(B)

As a result, the arithmetic circuit 402 outputs the value (Y) expressed by the following equation.

$$(Y)=(X)+(B)=[R11]+X(t-\alpha 1)$$

In this case, the content of the register R11 has already been cleared at the time when the operation at the previous sampling time (t−1) has completed. Accordingly, the value (Y) in step (4) becomes X(t−α1). Subsequently, the value (Y) is transferred to the register R11, and stored there.

(5) Then, in order to read out the amplitude data X(t−α1) from the memory D1, to multiply the same by a coefficient Kn18, and to store the sum of the product Kn18·X(t−α1) and the content "Kn17·X(t−j)" of the register R5 in the register R6, first the content "Kn17·X(t−j)" of the register R5 is transferred to the latch 404 in the same manner as step c-(1).

(6) Then, in order to perform the following operation $$(Y)=Kn18\cdot X(t-\alpha 1)+Kn17\cdot X(t-j)$$

where X(t−α1) is the amplitude data latched at the latch 101, "Kn17·X(t−j)" is the data latched at the latch 404, and Kn18 is a coefficient, signals ADR[Km] to CTL of the content shown below are output from the control signal output register 303.

ADR[Km]:ADR[K18]
L4:"1" (LATCH)
SL1:SELECT (B)
SL2:SELECT (B)
CTL:(Y)=(A)·(X)+(B)

As a result, the arithmetic circuit 402 outputs the following.

$$(Y)=(A)\cdot(X)+(B)=Kn18\cdot X(t-\alpha 1)+Kn17\cdot X(t-j)$$

The resultant value (Y) is loaded to the address corresponding to the current time (t) in the memory D1 through the register R6 in the next step. Thereafter, the register R6 is cleared so as to be ready for the memory D2 system processing.

(7) Then, the processing relative to each system of memories D2 to D9 is performed in the similar manner as steps c-(3) through c-(6). Then, as the processing of each system of memories D1 through D9 completes, data about reverberation tone RVD1 expressed by $$RVD1(t)=\sum_{m=1}^{9}X(t-xm)$$

is obtained at the register R11.

Now, the operation for forming reverberation tones RVD2 of a small delay length will be described.

d. Reverberation tone RVD2 forming operation (1) First, in order to read out the amplitude data RVD1 (t−β1) time β1 before from the memory MD0, signals DLa to L2 of the content shown below are output from the control signal output register 303.

DLa:DL0
DLb:$DL_{MD}$
L3:"1" (LATCH)
L1:"1" (LATCH)

As a result, at the address data output circuit 309, an address data DM·ADR for the memory MD0 is formed in the same manner as step c-(3), and amplitude data RVD(t−β1) time β1 before is read out from the memory MD0. The data RVD(1−β1) thus read is latched at the latch 101.

(2) Then, in order to perform operation of $$Kn30 \cdot RVD1(t-\beta 1)+RVD1(t)$$

where RVD1(t−β1) is the amplitude data latched at the latch 101, RVD1(t) is the output data of register R11, and Kn30 is a coefficient, and to cause the register 12 to store the resultant value, the output data RVD1(t) of the register R11 is transferred to the latch 404, and then signals ADR[Km] to CTL of the content shown below are output from the control signal output register 303.

ADR[Km] : ADR[K30]
L4:"1" (LATCH)
SL1:SELECT (B)
SL2:SELECT (B)
CTL:(Y)=(A)·(X)+(B)

As a result, the arithmetic circuit 402 outputs the value (Y) resulted from the following operation.

$$\begin{aligned}(Y) &= (A)\cdot(X)+(B)\\ &= Kn30\cdot RVD1(t-\beta 1)+RVD1(t)\end{aligned}$$

The value (Y) is stored in the register R12 in the next step.

(3) Then, in order to multiply the content "Kn30·RVD1(t−β1)+RVD1(t)" of the register R12 by a coefficient Kn29, first the content of the register R12 is transferred to the latch 404, and then signals ADR[Km] to CTL of the content shown below are output from the control signal output register 303.

ADR[Km]:ADR[K29]
L4:"1" (LATCH)
SL1:SELECT (C)
SL2:SELECT (B)
CTL:(Y)=(A)·(X)

As a result the arithmetic circuit 402 output the value (Y) given by the following operation.

$$\begin{aligned}(Y) &= (A)\cdot(X)\\ &= Kn29\cdot\{Kn30\cdot RVD1(t-\beta 1)+RVD(t)\}\end{aligned}$$

The value (Y) is stored in the register R13 in the next (4) Then, in order to add the content of the register R13 and the data RVD1(t−β1) (this data is latched at the latch 101 in the d-(1)) time β1 before, and to cause the register R13 to store the resultant sum, after the content "Kn29·{Kn30·RVD1(t−β1)+RVD1(t)}" of the register R13 is stored in the same manner as step d-(2), signals SL1 and CTL of the content shown below are output from the control signal output register 303.

SL1:SELECT (B)
CTL:(Y)=(B)+(X)

As a result, the arithmetic circuit 402 outputs the value (Y) obtained by the following operation.

$$\begin{aligned}(Y) &= (B)+(X)\\ &= RVD1(t-\beta 1)+Kn29\cdot\{Kn30\cdot RVD1(t-\beta 1)+RVD1(t)\}\end{aligned}$$

The value (Y) is stored in the register R13, and output as a reverberation tone data RVD2A.

(5) Then, in order to use the content "Kn30·RVD1(t−β1) of the register R12 at the sampling time (t+β1) delayed by time β1, the content of the register R12 is loaded to the address corresponding to the current time (t) of the memory MD0.

Thereafter, reverberation tones RVD2B and RVD2C of the delay length smaller than β1 are formed. As step d-(5) for forming the reverberation tone RVD2C completes, the data of said reverberation tone RVD2C is loaded to the output register 500 in the same manner as step a-(8), and transferred to the attenuator 501. As a result, a digital musical tone signal provided with the modulation effect as well as the reverberation effect are obtained.

While the above description has been made for the case where, in one sampling time of the digital musical tone signal, first the processing for the modulation effect is performed, and then the processing for the reverberation effect is performed, this sequence may be reversed. Moreover, the combination of effects is not limited to that of the modulation effect and the reverberation effect, and the combination of different modulation effects are also feasible.

What is claimed is:

1. A sound effect imparting device for an electronic musical instrument comprising:

selecting means for selecting at least one sound effect from among plural types of sound effects, a sound effect circuit including an arithmetic circuit and a digital memory utilized cooperatively for performing predetermined digital arithmetic operations on a digital musical tone signal input to said sound effect circuit so as to impart one or more selected predetermined sound effects to said input digital musical tone signal, control means for storing control data which controls the digital arithmetic operations in said sound effect circuit corresponding to said plural types of sound effects, for reading said control data corresponding to said selected sound effects and for controlling said sound effect circuit to perform said predetermined operations based on said control data, and wherein said sound effect circuit executes in a time division manner the predetermined digital arithmetic operations corresponding to a plurality of concurrently selected effects in accordance with the control data read by said control means.

2. A sound effect imparting device for an electronic musical instrument as defined in claim 1, further comprising:

a parameter memory for storing a plurality of parameters respectively corresponding to plural types of sound effects to be imparted to a musical tone, and read-out means for reading from said parameter memory the parameter corresponding to the selected sound effect, said sound effect circuit performing said predetermined digital arithmetic operation based on the parameter read out from said parameter memory by said read-out means.

3. A sound effect imparting device for an electronic musical instrument as defined in claim 2, wherein said plural types of sound effects include a modulation effect and a reverberation effect, and said parameters includes modulation coefficient, reverberation coefficient and delay time.

4. A sound effect imparting device for an electronic musical instrument as defined in claim 3, wherein said modulation effect includes a vibrato effect, chorus effect and ensemble effect.

5. A sound effect imparting device for an electronic musical instrument as defined in claim 2, wherein the value of said parameter corresponding to the selected sound effect varies with a passage of time.

6. A sound effect imparting device for an electronic musical instrument as defined in claim 3, wherein said sound effect circuit comprises a first adder means, a second adder means, a first multiplier means, a second multiplier means, and a first digital delay means for delaying output of said first adder means, said first adder means adding said input digital musical tone signal and the output of said second multiplier means, said second adder means adding the outputs of said first multiplier means and said first digital delay means, said first multiplier means multiplying the output of said first adder means by said modulation coefficient, said second multiplier means multiplying the output of said delay means by said modulation coefficient, whereby a modulated digital musical tone signal is outputted from said second adder means.

7. A sound effect imparting device for an electronic musical instrument as defined in claim 3, wherein said sound effect, circuit comprises a first means for forming an initial echo tone and a second means for forming a reverberation tone.

8. A sound effect imparting device for an electronic musical instrument as defined in claim 7, wherein said first means comprises a memory means for sequentially storing the sampled amplitude values of said input digital musical tone signal, a plurality of second readout means for reading from said memory means stored values for each of plural different sampling times, a plurality of third multiplier means for multiplying the read value by each reverberation coefficent, and a third adder means for adding the multiplied value by said third multiplier means, whereby an initial echo tone is formed from the added value of said third adding means.

9. A sound effect imparting device for an electronic musical instrument as defined in claim 7, wherein said second means comprises a second digital delay means for delaying an input digital musical tone signal substantially by the time taken by said first means to form said initial echo tone, a first reverberation tone forming means for forming a first echo tone regularly varing an amplitude level and having a relatively coarse delay time interval, and a second reverberation tone forming means for forming from the output of said first reverberation tone forming means a second echo tone having a relatively dense delay time interval as compared with said first echo tone.

10. A sound effect imparting device for an electronic musical instrument as defined in claim 9, wherein said first reverberation tone forming means comprises a plurality of delay means provided in parallel with each other having comb type digital filter structures of different delay times.

11. A sound effect imparting device for an electronic musical instrument as defined in claim 9, wherein said second reverberation tone forming means comprises a plurality of delay means provided in parallel with each other having all pass type digital filter structure with flat frequency characteristics.

12. A sound effect imparting device for an electronic musical instrument as defined in claim 9, wherein band pass digital filter means is inserted between said digital delay means and said first reverberation tone forming means.

13. A sound effect imparting device for an electronic musical instrument as defined in claim 9, wherein a plurality of digital filter means of different characteristics are respectively inserted between said digital delay means and said first reverberation tone forming means, a plurality of delay means of comb-type digital filter structure forming said first reverberation tone forming means are divided into a plurality of sets, and the outputs of said respective digital filter means are applied to said respective sets.

14. A sound effect imparting device for an electronic musical instrument as defined in claim 6, wherein said digital delay means has a delay time corresponding to an integer times the sampling period of said input digital musical tone signal.

15. A sound effect imparting device for an electronic musical instrument as defined in claim 6 wherein said digital delay means is composed of said digital memory means and said digital memory means is controlled in accordance with a predetermiend relation between the write address and read-out address.

16. A sound effect imparting device for an electronic musical instrument as defined in claim 6, wherein the output of said digital delay means is multiplied by a predetermined coefficient and fed back to the input thereof.

17. A device for imparting a frequency modulation effect to an input musical tone signal in an electronic musical instrument comprising:

a first adder means,
a second adder means,
a first multiplier means,
a second multiplier means,
delay means for delaying output of said first adder means, and
modulation information generating means for generating time varying modulation information corresponding to a frequency modulation type of sound effect to be imparted to a musical tone, said first adder means adding an input digital musical tone signal and the output of said second multiplier means, said second adder means adding the output of said first multiplier and the output of said delay means, said first multiplier means multiplying the output of said first adder means by said modulation information, said second multiplier means multiplies the output of said delay means by said modulation information, thereby obtaining a digital musical tone signal modulated by the output of said second adder means.

18. A sound effect imparting device for an electronic musical instrument as defined in claim 17, wherein said modulation information generating means comprises a plurality of modulation waveform memories for storing modulation waveforms, an effect designation switch for selecting one of a plurality of modulation effects, and an address generator for sequentially generating read addresses for reading a modulation waveform from a selected one of said modulation waveform memories, whereby a selected one of modulation waveforms selected by said effect designation switch from said modulation waveform memories is read in accordance with the read address generated from said address generator.

19. A sound effect imparting device for an electronic musical instrument as defined in claim 18, wherein said address generator comprises a clock generator for generating a clock pulse of a predetermined frequency corresponding to the selection of said effect designation switch, and a counter for counting the clock pulses from said generator to form said read address.

20. A sound effect imparting device for an electronic musical instrument as defined in claim 18, wherein said address generator comprises a frequency number memory means for reading a predetermined frequency number corresponding to the sound effect selected by said effect designation switch, and an accumulator means for accumulating the frequency number read from said frequency number memory to form said read address.

21. A sound effect imparting device for an electronic musical instrument comprising:

first means having a memory means for sequentially storing respective sampled amplitude values of an input digital musical tone signal, a plurality of read-out means for reading the sampled amplitude values previously stored at different sampling times from said memory means, a plurality of multiplier means for multiplying the sampled amplitude values read by said read-out means by respective different reverberation coefficients, an an adder means for adding the multiplied values from said multiplier means, for forming an initial echo from the added value of said adder means, and second means having a digital delay means for delaying the input digital musical tone signal substantially by an initial echo generating time, first reverberation tone forming means for forming a first reverberation tone from the output of said digital delay means by regularly varying the amplitude level and the delay time thereof with a coarse delay time interval, and second reverberation tone forming means for forming, from the output of said first reverberation forming means, a second reverberation tone having a dense time interval as compared with said first reverberation tone, for forming a reverberation tone, said first means, said second means, and said first and second reverberation tone forming means all being entirely digital.

22. A sound effect imparting device for an electronic musical instrument as defined in claim 21, wherein said first reverberation tone forming means comprises a plurality of delay means, provided in parallel, forming a comb type digital filter structure with said plural delay means having different delay times.

23. A sound effect imparting device for an electronic musical instrument as defined in claim 21, wherein said second reverberation tone forming means comprises a plurality forming an delay means, provided in series, of all pass digital filter structure having flat frequency characteristic.

24. A sound effect imparting device for an electronic musical instrument as defined in claim 21, wherein a band pass digital filter means is inserted between said digital delay means and said first reverberation tone forming means.

25. A sound effect imparting means for an electronic musical instrument as defined in claim 22, wherein a plurality of digital filter means of different characteristics are respectively inserted between said digital delay means and said first reverberation forming means, said delay means of comb type digital filter structure forming said first reverberation tone forming means are divided into a plurality of sets, and the outputs of said respective digital filter means are respectively applied to the plurality of sets.

26. A sound effect imparting means for an electronic musical instrument, as defined in claim 22, wherein said delay means forming a comb type digital filter structure comprises a first multiplier, a second multiplier, an adder, and a digital delay circuit for delaying the output of said adder, said first multiplier multiplying an input digital signal by the first reverberation coefficient, said second multiplier multiplying the output of said digital delay circuit by the second reverberation coefficient, said adder adding the output of said first multiplier and the output of said second multiplier, thereby obtaining from the output of said delay circuit a digital output signal.

27. A sound effect imparting means for an electronic musical instrument as defined in claim 23, wherein said delay means forming an all pass type digital filter structure comprises a first adder circuit, a second adder circuit, a first multiplier circuit, a second multiplier circuit, and a digital delay circuit for delaying the output of said first adder circuit, said first adder circuit adding the input digital signal and the output of said second multiplier circuit, said second adder circuit adding the output of said first multiplier circuit and the output of said digital delay circuit, said first multiplier circuit multiplying the output of said first adder circuit by said reverberation coefficient, said second multiplier circuit multiplying the output of said digital delay means by said second reverberation coefficient, thereby obtaining from the output of said second adder circuit an output digital signal.

28. A sound effect imparting device according to claim 21 and having a single arithmetic unit and a single digital memory unit, and wherein said first means, said second means, and said first and second reverberation tone forming means all are implemented by utilizing said single digital memory unit and said single arithmetic unit on a time shared basis.

29. A device according to claim 28 further comprising means for imparting a frequency modulation effect to said input digital musical tone signal, said same single digital memory unit and single arithmetic unit being utilized on a time shared basis both to impart said frequency modulation effect and to implement said first and second means and said first and second reverberation tone forming means, so as to additionally impart a reverberation effect to said input musical tone signal.

* * * * *